US010582530B2

(12) United States Patent
Zou et al.

(10) Patent No.: US 10,582,530 B2
(45) Date of Patent: Mar. 3, 2020

(54) DATA TRANSMISSION AND RETRANSMISSION FOR SEMI-PERSISTENT SCHEDULING

(71) Applicant: Telefonaktiebolaget LM Ericsson (publ), Stockholm (SE)

(72) Inventors: Zhenhua Zou, Solna (SE); Ali Behravan, Stockholm (SE); Daniel Larsson, Lund (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 0 days.

(21) Appl. No.: 16/193,557

(22) Filed: Nov. 16, 2018

(65) Prior Publication Data

US 2019/0150180 A1 May 16, 2019

Related U.S. Application Data

(60) Provisional application No. 62/587,216, filed on Nov. 16, 2017.

(51) Int. Cl.
*H04L 1/16* (2006.01)
*H04L 1/18* (2006.01)
(Continued)

(52) U.S. Cl.
CPC ....... *H04W 72/1284* (2013.01); *H04L 1/1657* (2013.01); *H04L 1/188* (2013.01);
(Continued)

(58) Field of Classification Search
CPC . H04W 72/044; H04W 72/042; H04W 72/14; H04W 72/0466; H04L 1/1851
See application file for complete search history.

(56) References Cited

U.S. PATENT DOCUMENTS

2012/0099577 A1\* 4/2012 Baldemair ........ H04W 56/0045
370/338
2017/0373803 A1\* 12/2017 Wu ........................ H04L 1/1861
(Continued)

OTHER PUBLICATIONS

International Search Report and Written Opinion dated Feb. 12, 2019 for International Application No. PCT/EP2018/081593 filed on Nov. 16, 2018, consisting of 13-pages.
(Continued)

*Primary Examiner* — Un C Cho
*Assistant Examiner* — Peter K Mak
(74) *Attorney, Agent, or Firm* — Christopher & Weisberg, P.A.

(57) ABSTRACT

A method, wireless device and network node are disclosed. According to one aspect, a wireless device comprises a radio interface configured to obtain a timer value, T, for measuring time elapsed from a start of a semi-persistent scheduled, SPS, uplink, UL, data transmission. The wireless device comprises processing circuitry configured to perform an SPS UL data transmission associated with a hybrid automatic repeat request, HARQ, process identification, ID, wherein the HARQ process ID is one of a plurality of HARQ process IDs. The processing circuitry is configured to perform a new data transmission or autonomous retransmission with said HARQ process ID at the next available time for said HARQ process ID after elapsed time T.

8 Claims, 13 Drawing Sheets

(51) Int. Cl.
*H04W 72/14* (2009.01)
*H04L 5/00* (2006.01)
*H04W 72/12* (2009.01)

(52) U.S. Cl.
CPC .......... *H04L 1/1812* (2013.01); *H04L 1/1867* (2013.01); *H04L 1/1887* (2013.01); *H04W 72/14* (2013.01); *H04L 5/0055* (2013.01)

(56) References Cited

U.S. PATENT DOCUMENTS

2018/0049229 A1* 2/2018 Dinan ................... H04L 1/1812
2019/0053211 A1* 2/2019 Ying ................... H04W 72/042
2019/0068317 A1* 2/2019 Babaei ................. H04W 76/27

OTHER PUBLICATIONS

3GPP TSG-RAN WG2 Meeting#99bis R2-1710322; Title: consideration on SPS and grant-free; Agenda Item: 10.3.1.8; Source: ZTE; Document for: Discussion and Decision; Location and Date: Prague, Czech Republic, Oct. 9-13, 2017, consisting of 6-pages.

3GPP TSG-RAN WG2 #99bis R2-1711253; Title: Remaining issues on SPS UL; Agenda Item: 10.3.1 .8;Source: Ericsson; Document for: Discussion, Decision; Location and Date: Prague, Czech Republic, Oct. 9-13, 2017, consisting of 7-pages.

3GPP TSG-RAN WG2 #99bis R2-1711254; Title: Enhanced HARQ feedback mode in SPS; Agenda Item: 10.3.1.13; Source: Ericsson; Document for: Discussion, Decision; Location and Date: Prague, Czech Republic, Oct. 9-13, 2017, consisting of 4-pages.

* cited by examiner

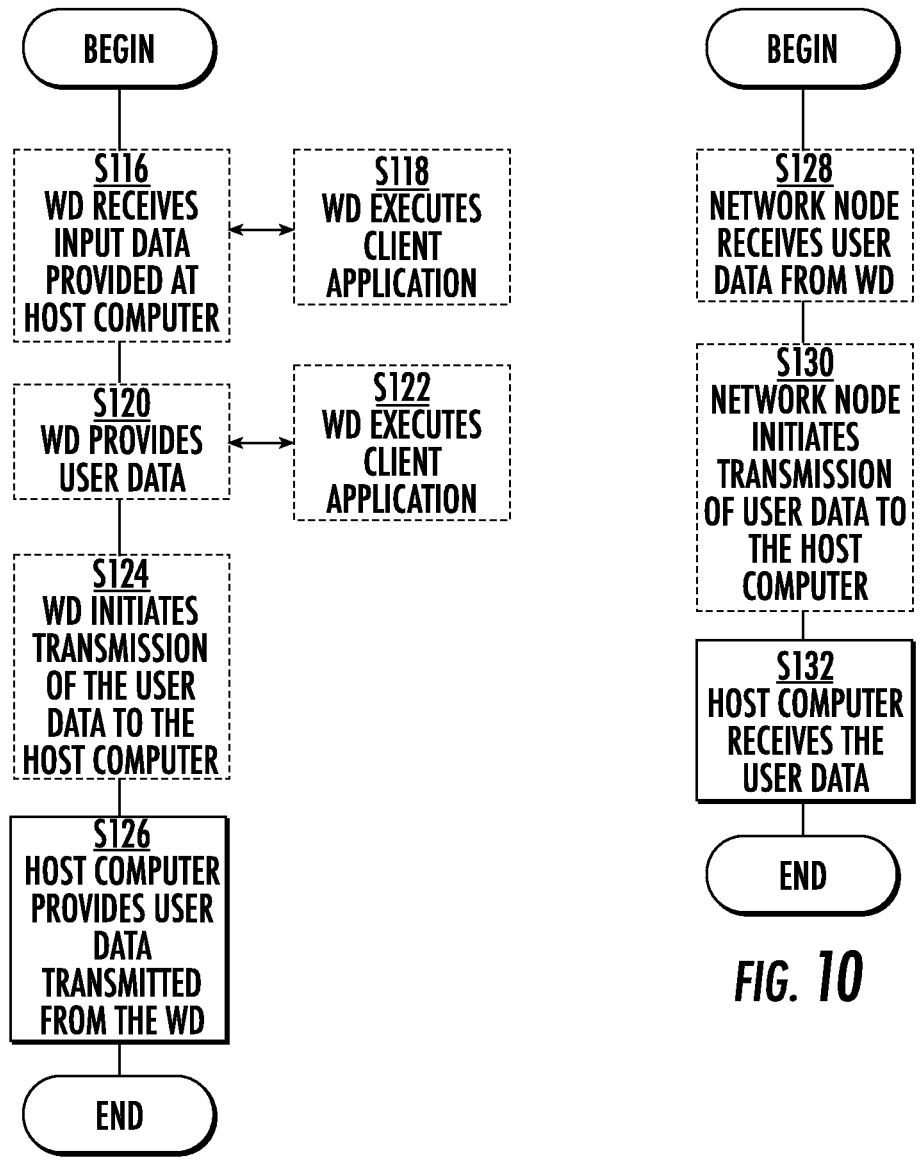

DATA TRANSMISSION AND RETRANSMISSION FOR SEMI-PERSISTENT SCHEDULING

CROSS-REFERENCE TO RELATED APPLICATION

This application is related to and claims priority to U.S. Provisional Patent Application Ser. No. 62/587,216, filed Nov. 16, 2017, entitled METHODS OF HANDLING RETRANSMISSION, the entirety of which is incorporated herein by reference.

FIELD

The present disclosure relates to wireless communications, and in particular, HARQ transmission in uplink semi-persistent scheduling transmission operation.

BACKGROUND

In cellular wireless systems, such as Long Term Evolution (LTE) and New Radio (NR) standards in the Third Generation Partnership Project (3GPP), resources for uplink (UL) transmissions are normally scheduled by a network node (eNB or gNB). This can be done dynamically, i.e., the eNB schedules the UL transmission per transmission time interval (TTI). Alternatively, this can be done using a semi-persistent scheduling (SPS) framework, so that multiple TTIs are granted at the same time, i.e., prior to a data transmission, where UL transmissions are scheduled without a dynamic grant. Configuration of SPS includes periodicity of the grant, allocation and modulation and coding scheme (MCS) in subsequent SPS occasions.

Another related concept in wireless transmission is data retransmission. When the transmission of data fails due to some errors in the channel that cannot be fixed in the decoding, the receiver may ask the transmitter for data retransmission. The retransmission method may simply be transmitting the same data or a better coded data, with lower rate, etc. At the receiver side, the receiver may simply use the new, retransmitted, data instead of the old one or combine them to make a more reliable detection. This is the basis of Hybrid Automatic Repeat Request (HARQ).

LTE uses a synchronous HARQ concept where acknowledging of correctly received data or acknowledging of an erroneous detection (ACK/NACK) has to be sent by the receiver of data at a certain time in a Physical Hybrid-ARQ Indicator Channel (PHICH). In LTE, the wireless device (wireless device) uses the same HARQ process number every 8 TTIs. Retransmission of the data, if needed, with the same HARQ happens every 8 TTIs. Since the wireless device uses a specific HARQ process identification (ID) at a specific subframe, the eNB knows exactly which HARQ is received and when it is received.

The NR standard that is being specified in 3GPP is based on asynchronous HARQ transmission, which means that there is no certain time that is expected for ACK/NACK, i.e., PHICH will not be introduced. Moreover, in LTE sTTI and in reduced processing time (n+3), PHICH is not introduced and therefore no ACK/NACK is transmitted.

SPS (the term in LTE) is the same as "UL transmission without UL grant—type 2" that is being discussed in 3GPP. The other "UL transmission without UL grant—type 1" is different only in the resource configuration. Since the final terminology has not been settled yet, in this disclosure, SPS is used to refer to both LTE SPS and NR "UL transmission without UL grant" type 1 and type 2, or 'configured grant' which corresponds to an uplink transmission without a dynamic grant.

SUMMARY

It is an object of the present application to provide solutions for HARQ feedback for semi-persistent scheduling. Some embodiments advantageously provide methods, wireless devices, and network nodes for processing HARQ transmissions. In particular, for asynchronous HARQ transmission, solutions are provided which determine whether a new data transmission or retransmission should be performed and at what point in time the retransmission or new data transmission should occur. In this disclosure, arrangements to handle misalignments between a retransmission (feedback) timer, T and the time to cycle through a plurality of HARQ processes, $\tau$ (where "$\tau$" is the Greek letter, tau) are proposed. An advantage is that multiple semi-persistent HARQ processes can be handled asynchronously, i.e. without explicit, dedicated signaling, and the transmission node can determine the feedback autonomously. This provides more efficient use of transmission resources.

According to one method, a retransmission or new data transmission is performed at a time determined by $\min(T,\tau)$. This means that the rule for retransmission, for example, applies after expiring a timer with time of $\min(T,\tau)$.

According to another method, if the timer value T is smaller than or equal to $\tau$, then there is no need to have the timer value T, and after time $\tau$ the wireless device assumes ACK (or NACK) and moves on to the next transmission (or retransmits the same packet).

If the timer value T is larger than $\tau$, then after time $\tau$, the wireless device assumes that the UL transmission has been unsuccessful and retransmits in the next occasion. The proposed methods avoid ambiguity when the timer is longer than the HARQ cycle.

Thus, according to one embodiment, a wireless device includes a radio interface configured to obtain a timer value, T, for measuring time elapsed from a start of a semi-persistent scheduled, SPS, uplink, UL, data transmission. The WD also includes processing circuitry configured to perform an SPS UL data transmission associated with a hybrid automatic repeat request, HARQ, process identification, ID, wherein the HARQ process ID is one of a plurality of HARQ process IDs, and perform a new data transmission or autonomous retransmission with said HARQ process ID at the next available time for said HARQ process ID after elapsed time T.

According to this aspect, in some embodiments, the processing circuitry is further configured to assume one of an acknowledgement, ACK, and non-acknowledgment, NACK for the SPS UL data transmission with said HARQ process ID at the next available time for said HARQ process ID after elapsed time T. In some embodiments, the next available time after elapsed time T occurs after the larger of the obtained timer value, T, and a total time, $\tau$, to cycle through the plurality of HARQ process IDs for SPS UL data transmissions. In some embodiments, the processing circuitry is further configured to, at the next available time for said HARQ process ID after elapsed time T, assume an ACK and perform a new data transmission with said HARQ process ID. In some embodiments, the processing circuitry is further configured to measure time elapsed from a start of the SPS UL data transmission until the elapsed time equals one of the obtained value, T, and the total time, $\tau$, to cycle through the plurality of HARQ process IDs for SPS UL data transmissions. In some embodiments, if T is less than τ, then the next available time for said HARQ process ID occurs after time τ; and if T is greater than τ, then next available time for said HARQ process ID occurs after elapsed time T and up to T+τ. In some embodiments, a feedback timer is set to the lesser of T and τ and when T is less than τ, then, after elapsed time T, the wireless device assumes an ACK and uses a corresponding HARQ process ID for one of transmission of a new data packet and retransmission of a same data packet at the time τ.

According to another aspect, a method for performing uplink transmissions, implemented by a wireless device is provided. The method includes obtaining a timer value, T, for measuring time elapsed from a start of a semi-persistent scheduled, SPS, uplink, UL, data transmission. The method includes performing an SPS UL data transmission associated with a hybrid automatic repeat request, HARQ, process identification, ID, wherein the HARQ process ID is one of a plurality of HARQ process IDs. The method also includes performing a new data transmission or autonomous retransmission with said HARQ process ID at the next available time for said HARQ process ID after elapsed time T. In some embodiments, the method further includes assuming one of an acknowledgement, ACK, and non-acknowledgment, NACK for the SPS UL data transmission with said HARQ process ID at the next available time for said HARQ process ID after elapsed time T. In some embodiments, the next available time after elapsed time T occurs after the larger of the obtained timer value, T, and a total time, τ, to cycle through the plurality of HARQ process IDs for SPS UL data transmissions. In some embodiments, the method further includes at the next available time for said HARQ process ID after elapsed time T, assuming an ACK and performing a new data transmission with said HARQ process ID. In some embodiments, the method further includes measuring time elapsed from a start of the SPS UL data transmission until the elapsed time equals one of the obtained value, T, and the total time, τ, to cycle through the plurality of HARQ process IDs for SPS UL data transmissions. In some embodiments, if T is less than τ, then the next available time for said HARQ process ID occurs after τ; and if T is greater than τ, then the next available time for said HARQ process ID occurs after elapsed time T and up to T+τ. In some embodiments, a feedback timer is set to the lesser of T and τ and: when T is less than τ, then, after elapsed time T, the wireless device assumes an ACK and uses a corresponding HARQ process ID for one of transmission of a new data packet and retransmission of a same data packet at the time τ.

According to yet another aspect, a network node includes a radio interface configured to receive, from a wireless device, a semi-persistent scheduled, SPS, uplink, UL, data transmission associated with a hybrid automatic repeat request, HARQ, process identification, ID, wherein the HARQ process ID is one of a plurality of HARQ, process IDs. The network node also includes processing circuitry configured to: measure a time, T, subsequent to receipt of the SPS UL data transmission; attempt a decoding of the SPS UL data transmission; and receive, after the elapsed time T, for said HARQ process ID, one of a new SPS UL data transmission and a retransmission of the previously received SPS UL data transmission.

According to this aspect, in some embodiments, the processing circuitry is further configured to not send, to the wireless device, an Ack for the received SPS UL data transmission when the attempted decoding is successful and receive, after the elapsed time T, a new SPS UL data transmission for said HARQ process ID. In some embodiments, the received new SPS UL data transmission for said HARQ process occurs after an elapsed time greater than time T wherein the elapsed time corresponds to a time, τ, during which the wireless device cycles through the plurality of HARQ, process IDs for SPS UL data transmission. In some embodiments, the received new SPS UL data transmission for said HARQ process occurs after an elapsed time greater than time T wherein the elapsed time corresponds to time T and next available time for said HARQ process ID.

According to another aspect, a method implemented by a network node is provided. The method includes receiving, from a wireless device, a semi-persistent scheduled, SPS, uplink, UL, data transmission associated with a hybrid automatic repeat request, HARQ, process identification, ID, wherein the HARQ process ID is one of a plurality of HARQ process IDs. The method also includes measuring a time, T, subsequent to receipt of the SPS UL data transmission. The method also includes attempting a decoding of the SPS UL data transmission. The method further includes receiving, after the time T, for said HARQ process ID, one of a new SPS UL data transmission and a retransmission of the previously received SPS UL data transmission.

According to this aspect, in some embodiments, the method includes not sending to the wireless device an Ack for the received SPS UL data transmission when the attempted decoding is successful and receiving, after the time T a new SPS UL data transmission for said HARQ process ID. In some embodiments, receiving the new SPS UL data transmission for said HARQ process occurs after an elapsed time greater than time T wherein the elapsed time corresponds to a time, τ, during which the wireless device cycles through the plurality of HARQ, process IDs for SPS UL data transmissions. In some embodiments, the received new SPS UL data transmission for said HARQ process occurs after an elapsed time greater than time T wherein the elapsed time corresponds to time T and a next available time for said HARQ process ID.

According to another aspect, a wireless device, comprising instructions which when executed on a processor cause the wireless device to perform any one of the methods described above. According to yet another aspect, a network node, comprising instructions which when executed on a processor cause the network node to perform any one of the methods described above. According to another aspect, a computer program product or storage media, comprising memory comprising instructions which when executed on a processor cause the processor to perform any one of the methods described above.

According to yet another aspect, a user equipment (UE) includes a radio interface configured with a timer value (T) for measuring time elapsed from a start of a semi-persistent scheduled (SPS) uplink (UL) data transmission. The UE also includes processing circuitry configured to perform an SPS UL data transmission associated with a hybrid automatic repeat request (HARQ) process identification (ID) wherein the HARQ process ID is one of a plurality of HARQ process IDs. The processing circuitry is also configured to, at a next available time for the HARQ process ID after elapsed time T, assume an acknowledgement (ACK) and perform a new data transmission with the HARQ process ID.

According to this aspect, in some embodiments, the next available time after elapsed time T occurs after the larger of the obtained timer value T and a total time (τ) to cycle through the plurality of HARQ process IDs for SPS UL data transmissions. In some embodiments, the processing circuitry is further configured to measure time elapsed from a start of the SPS UL data transmission until the elapsed time equals one of the obtained timer value T and the total time (τ) to cycle through the plurality of HARQ process IDs for SPS UL data transmissions. In some embodiments, if T is less than τ, then the next available time for the HARQ process ID occurs after time τ; and if T is greater than τ, then next available time for the HARQ process ID occurs after elapsed time T and up to T+τ. In some embodiments, a feedback timer is set to the lesser of T and τ and when T is less than τ, then, after elapsed time T, the UE assumes an ACK and uses a corresponding HARQ process ID for transmission of a new data packet at the time τ.

According to another aspect, a method for performing uplink transmissions, implemented by a user equipment (UE) is provided. The method includes configuring a timer value (T) for measuring time elapsed from a start of a semi-persistent scheduled (SPS) uplink (UL) data transmission. The method also includes performing an SPS UL data transmission associated with a hybrid automatic repeat request (HARQ) process identification (ID) wherein the HARQ process ID is one of a plurality of HARQ process IDs. The method further includes, at a next available time for the HARQ process ID after elapsed time T, assuming an ACK and performing a new data transmission with the HARQ process ID.

According to this aspect, in some embodiments, the next available time after elapsed time T occurs after the larger of the obtained timer value (T) and a total time (τ) to cycle through the plurality of HARQ process IDs for SPS UL data transmissions. In some embodiments, the method further includes measuring time elapsed from a start of the SPS UL data transmission until the elapsed time equals one of the obtained value (T) and the total time (τ) to cycle through the plurality of HARQ process IDs for SPS UL data transmissions. In some embodiments, if T is less than τ, then the next available time for the HARQ process ID occurs after τ; and if T is greater than τ, then the next available time for the HARQ process ID occurs after elapsed time T and up to T+τ. In some embodiments, a feedback timer is set to the lesser of T and τ and: when T is less than τ, then, after elapsed time T, the UE assumes an ACK and uses a corresponding HARQ process ID for transmission of a new data packet at the time τ.

According to another aspect, a base station is provided. The base station includes a radio interface configured to receive, from a UE, a semi-persistent scheduled (SPS) uplink (UL) data transmission associated with a hybrid automatic repeat request (HARQ) process identification (ID) wherein the HARQ process ID is one of a plurality of HARQ, process IDs. The base station further includes processing circuitry configured to: measure a time, T, subsequent to receipt of the SPS UL data transmission; decode the SPS UL data transmission; and receive a new SPS UL data transmission for the HARQ process after an elapsed time greater than time T, the elapsed time corresponding to time T and a next available time for the HARQ process ID.

According to this aspect, in some embodiments, the next available time for the HARQ process ID corresponds to a time, τ, during which the UE cycles through the plurality of HARQ, process IDs for SPS UL data transmission.

According to another aspect, a method for receiving uplink transmissions, implemented by a base station is provided. The method includes receiving, from a UE, a semi-persistent scheduled (SPS) uplink (UL) data transmission associated with a hybrid automatic repeat request (HARQ) process identification (ID), the HARQ process ID being one of a plurality of HARQ, process IDs. The method also includes measuring a time, T, subsequent to receipt of the SPS UL data transmission decoding the SPS UL data transmission and receiving, after the elapsed time T, for the HARQ process ID, a new SPS UL data transmission for the HARQ process after an elapsed time greater than time T, the elapsed time corresponding to time T and a next available time for the HARQ process ID.

According to this aspect, in some embodiments, the next available time for the HARQ process ID corresponds to a time, τ, during which the UE cycles through the plurality of HARQ, process IDs for SPS UL data transmission.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIGS. 7-10 are flow charts illustrating exemplary methods implemented in a communication system including a host computer, a network node and a wireless device according to some embodiments of the present disclosure;

DETAILED DESCRIPTION

Figure 1:
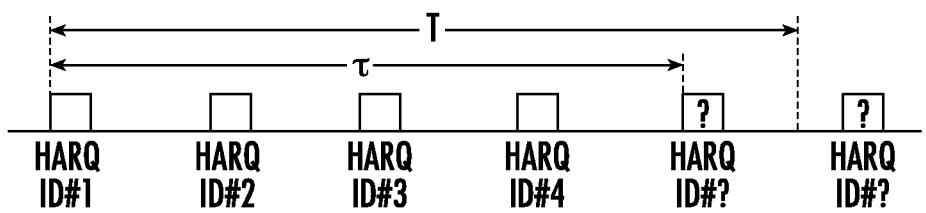
FIG. 1 is a diagram of successive HARQ IDs, showing ambiguity after a time T.

Before describing in detail exemplary embodiments, it is noted that the embodiments reside primarily in combinations of apparatus components and processing steps related to for processing HARQ transmissions. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or a wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (wireless device) such as a wireless device (wireless device) or a radio network node.

In some embodiments, the non-limiting terms wireless device or a user equipment (UE) are used interchangeably. The wireless device herein can be any type of wireless device capable of communicating with a network node or another wireless device over radio signals, such as wireless device. The wireless device may also be a radio communication device, target device, device to device (D2D) wireless device, machine type wireless device or wireless device capable of machine to machine communication (M2M), low-cost and/or low-complexity wireless device, a sensor equipped with wireless device, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE or NR, may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for processing of HARQ transmissions. One way of handling HARQ retransmission in SPS is by using a feedback timer with a preconfigured value T which starts from the moment a SPS transmission or retransmission occurs and expires after time T from the SPS transmission. When the timer expires, the wireless device can reuse the SPS HARQ process for new data or new transmissions. After expiring time T, the wireless device may assume an ACK for the corresponding transmission unless a NACK has been received before the timer expired. An alternative method would be that after expiring time T, the wireless device may assume NACK unless an ACK is received during time T.

In NR, it has been agreed that the HARQ ID is at least determined by the number of HARQ processes in the configuration and the time-domain resource for the UL data transmission. In other words, the HARQ ID is implicitly determined and known at both wireless device and gNB side. In LTE, the HARQ ID is computed by a formula.

One potential problem can occur if the time T is larger than the total time to cycle through the HARQ process IDs for UL SPS/grant-free transmission ($\tau$). A short HARQ cycle can be a result of the number of HARQ processes being small and the SPS periodicity being short.

In this case, which is illustrated in FIG. 1, with the total number of HARQ processes equal to 4, it is not clear what HARQ process ID should be used for the packet after HARQ PID #4 and what the wireless device should assume for the UL transmission with HARQ PID #1 at time τ and whether a new UL data packet should be sent at this time or retransmission of process ID #1 should be performed at this time.

Some embodiments provide for selecting a HARQ ID based on a duration between a start of a semi-persistent scheduled (SPS) transmission and an elapsed timer, where the elapsed timer may be greater than or less than a total time to process a predetermined number of HARQ processes, where a HARQ process includes receiving or assuming one of an ACK and NACK, and deciding whether to transmit new data or retransmit data of a previous transmission.

Figure 2:
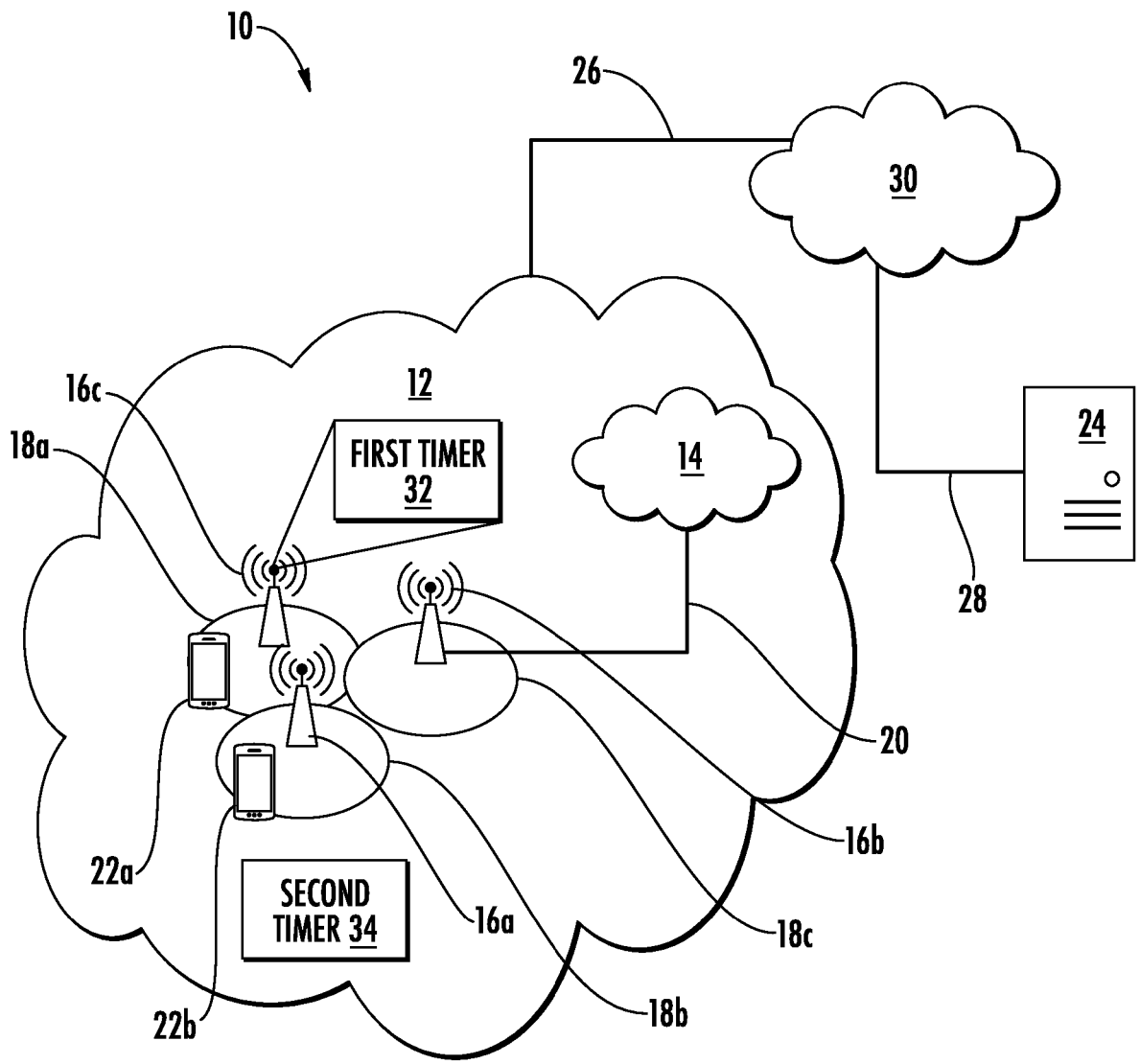
FIG. 2 is a schematic diagram of an exemplary network architecture illustrating a communication system connected via an intermediate network to a host computer according to the principles in the present disclosure.

Returning to the drawing figures, in which like elements are referred to by like reference numerals, there is shown in FIG. 2. a schematic diagram of a communication system, according to an embodiment, including a communication system 10, such as a 3GPP-type cellular network, which comprises an access network 12, such as a radio access network, and a core network 14. The access network 12 includes a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (wireless device) 22a located in coverage area 18a is configured to wirelessly connect to, or be paged by, the corresponding network node 16c. A second wireless device 22b in coverage area 18b is wirelessly connectable to the corresponding network node 16a. While a plurality of wireless devices 22a, 22b (collectively referred to as wireless devices 22) are illustrated in this example, the disclosed embodiments are equally applicable to a situation where a sole wireless device is in the coverage area or where a sole wireless device is connecting to the corresponding network node 16. Note that although only two wireless devices 22 and three network nodes 16 are shown for convenience, the communication system may include many more wireless devices 22 and network nodes 16.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected wireless devices 22a, 22b and the host computer 24. The connectivity may be described as an over-the-top (OTT) connection. The host computer 24 and the connected wireless devices 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected wireless device 22a. Similarly, the network node 16 need not be aware of the future routing of an outgoing uplink communication originating from the wireless device 22a towards the host computer 24.

A network node 16 is configured to include a first timer 32 which may be configured to measure a time, T, subsequent to receipt of the semi-persistent scheduled, SPS, transmission. A wireless device 22 is configured to include a second timer 34 which may be configured to measure time elapsed from a start of an SPS transmission until the elapsed time equals one of a predetermined timer value, T, and a total time, τ, to cycle through (process) all hybrid automatic repeat request, HARQ, process identifications, IDs. The predetermined timer value T may be determined at the network node 16 and transmitted to the wireless device 22. Note that the phrase "cycle through a plurality of HARQ process IDs" as used herein, means to receive or not receive, for each HARQ process ID, an ACK or NACK, and in response to receiving or not receiving the ACK or NACK, deciding whether to transmit new data or to retransmit previously transmitted data (in dependence of the feedback timer), and then taking action based on the decision.

Example implementations, in accordance with an embodiment, of the wireless device 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to a traditional processor and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be configured to provide a service to a remote user, such as a wireless device 22 connecting via an OTT connection 52 terminating at the wireless device 22 and the host computer 24. In providing the service to the remote user, the host application 50 may provide user data which is transmitted using the OTT connection 52. In one embodiment, the host computer 24 may be configured to provide control and functionality to a service provider and may be operated by the service provider or on behalf of the service provider.

The communication system 10 further includes a network node 16 provided in a communication system 10 and comprising hardware 58 enabling the network node to communicate with the host computer 24 and with the wireless device 22. The hardware 58 may include a communication interface 60 for setting up and maintaining a wired or wireless connection with an interface of a different communication device of the communication system 10, as well as a radio interface 62 for setting up and maintaining at least a wireless connection 64 with a wireless device 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to a traditional processor and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include the first timer 32 configured to measure a time, T, subsequent to receipt of the semi-persistent scheduled, SPS, transmission.

The communication system 10 further includes the wireless device 22 already referred to. The wireless device 22 may have hardware 80 that may include a radio interface 82 configured to set up and maintain a wireless connection 64 with a network node 16 serving a coverage area 18 in which the wireless device 22 is currently located. The radio interface 82 may be formed as or may include, for example, one or more RF transmitters, one or more RF receivers, and/or one or more RF transceivers.

The hardware 80 of the wireless device 22 further includes processing circuitry 84. The processing circuitry 84 may include a processor 86 and memory 88. In particular, in addition to a traditional processor and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the wireless device 22 further comprises software 90, which is stored in, for example, memory 88 at the wireless device 22, or stored in external memory (e.g., database) accessible by the wireless device 22. The software 90 may be executable by the processing circuitry 84. The software 90 includes a client application 92. The client application 92 may be operable to provide a service to a human or non-human user via the wireless device 22, with the support of the host computer 24. In the host computer 24, an executing host application 50 may communicate with the executing client application 92 via the OTT connection 52 terminating at the wireless device 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by wireless device 22. The processor 86 corresponds to one or more processors 86 for performing wireless device 22 functions described herein. The wireless device 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to wireless device 22. For example, the processing circuitry 84 of the wireless device 22 may, in some embodiments, include a second timer 34 configured to measure time elapsed from a start of a semi-persistent scheduled, SPS, uplink data transmission until the elapsed time equals one of a predetermined timer value, T, and a total time, τ, i.e., the predetermined timer value, T, or the total time, τ, to cycle through all hybrid automatic repeat request, HARQ, process identifications, IDs. The processing circuitry 84 may also include selector 94 configured to select a HARQ ID based on whether T is less than τ.

Figure 3:
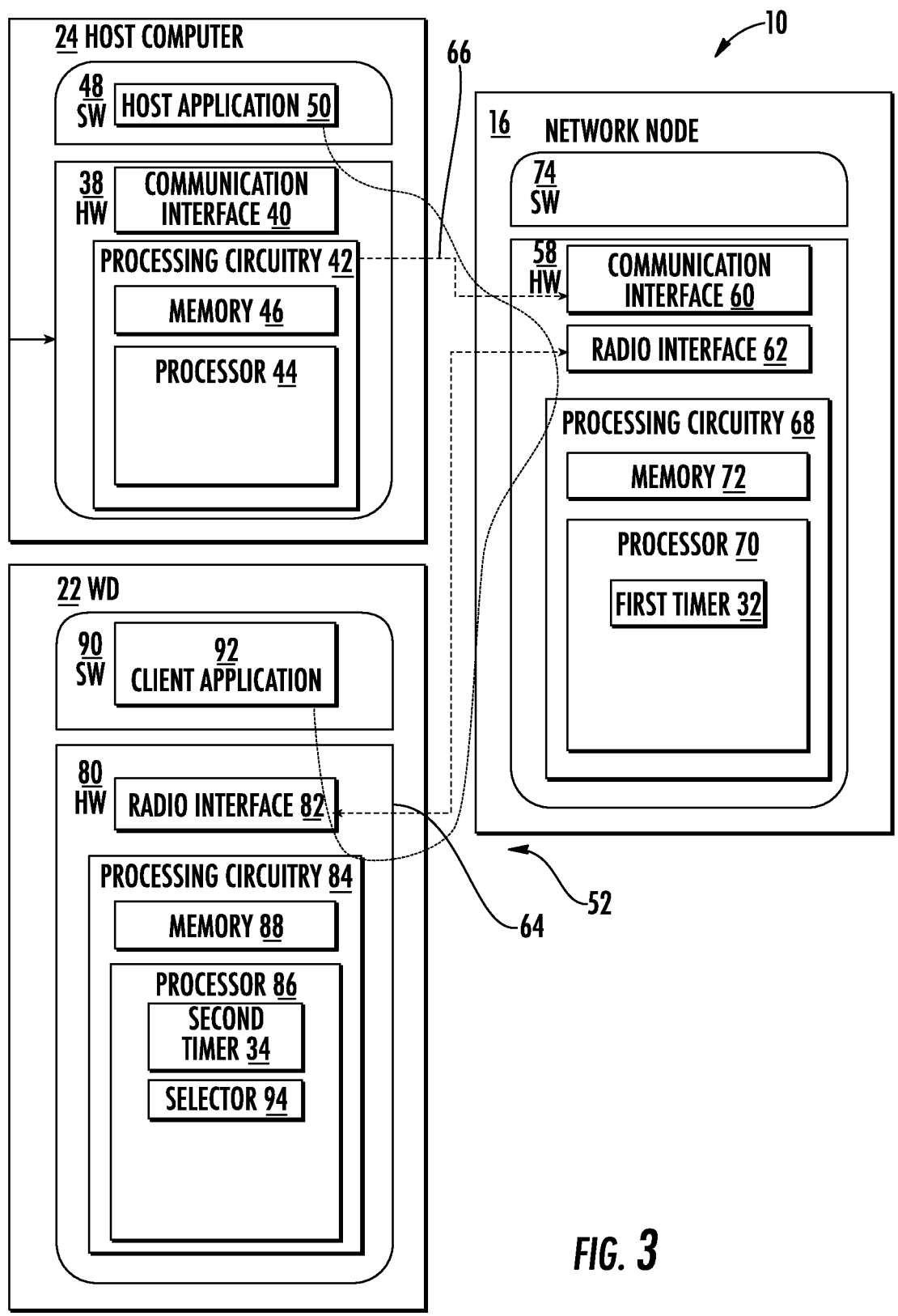
FIG. 3 is a block diagram of a host computer communicating via a network node with a wireless device over an at least partially wireless connection according to some embodiments of the present disclosure.

In some embodiments, the inner workings of the network node 16, wireless device 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the wireless device 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the wireless device 22 and the network node 16 is in accordance with the teachings of the embodiments described throughout this disclosure. One or more of the various embodiments improve the performance of OTT services provided to the wireless device 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and wireless device 22, in response to variations in the measurement results. The measurement procedure and/or the network functionality for reconfiguring the OTT connection 52 may be implemented in the software 48 of the host computer 24 or in the software 90 of the wireless device 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary wireless device signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Figure 4:
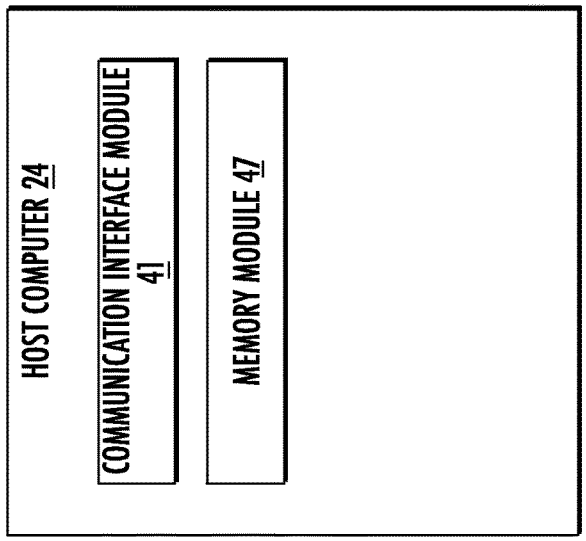
FIG. 4 is a block diagram of an alternative embodiment of a network node according to some embodiments of the present disclosure.

FIG. 4 is a block diagram of an alternative host computer 24, which may be implemented at least in part by software modules containing software executable by a processor to perform the functions described herein. The host computer 24 include a communication interface module 41 configured to set up and maintain a wired or wireless connection with an interface of a different communication device of the communication system 10. The memory module 47 is configured to store data, programmatic software code and/or other information described herein.

Figure 5:
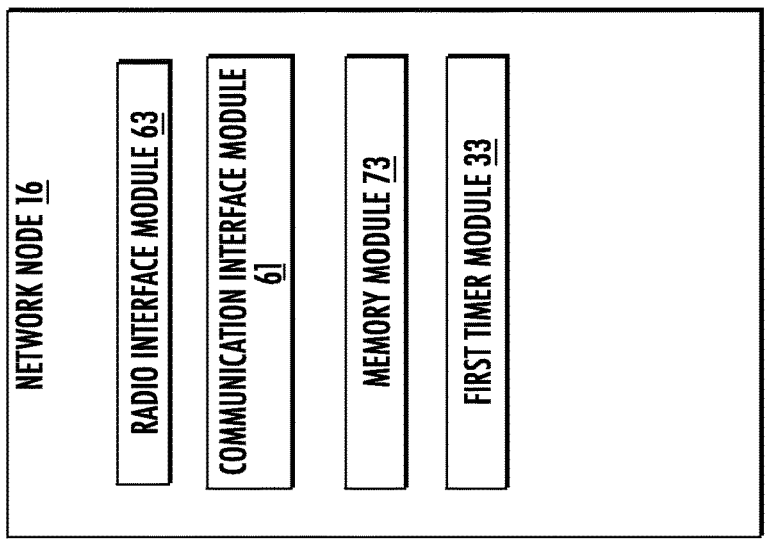
FIG. 5 is a block diagram of an alternative embodiment of a wireless device according to some embodiments of the present disclosure.

FIG. 5 is a block diagram of an alternative network node 16, which may be implemented at least in part by software modules containing software executable by a processor to perform the functions described herein. The network node 16 includes a radio interface module 63 configured for setting up and maintaining at least a wireless connection 64 with a wireless device 22 located in a coverage area 18 served by the network node 16. The network node 16 also includes a communication interface module 61 configured for setting up and maintaining a wired or wireless connection with an interface of a different communication device of the communication system 10. The communication interface module 61 may also be configured to facilitate a connection 66 to the host computer 24. The memory module 73 that is configured to store data, programmatic software code and/or other information described herein. The timer module 33 is configured to measure a time, T, subsequent to receipt of the semi-persistent scheduled, SPS, transmission.

Figure 6:
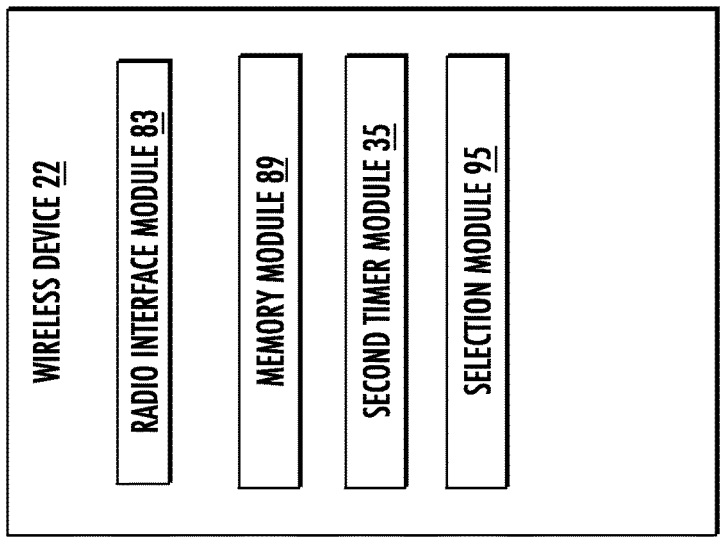
FIG. 6 is a block diagram of an alternative embodiment of a host computer according to some embodiments of the present disclosure.

FIG. 6 is a block diagram of an alternative wireless device 22, which may be implemented at least in part by software modules containing software executable by a processor to perform the functions described herein. The wireless device 22 includes a radio interface module 83 configured to set up and maintain a wireless connection 64 with a network node 16 serving a coverage area 18 in which the wireless device 22 is currently located. The memory module 89 is configured to store data, programmatic software code and/or other information described herein. The timer module 35 may be configured to measure time elapsed from a start of a semi-persistent scheduled, SPS, transmission until the elapsed time equals one of a predetermined timer value, T, and a total time, τ, to cycle through a plurality of hybrid automatic repeat request, HARQ, process identifications, IDs. The selection module 95 may be configured to select a HARQ ID based on whether T is less than τ.

Figures 7, 8:
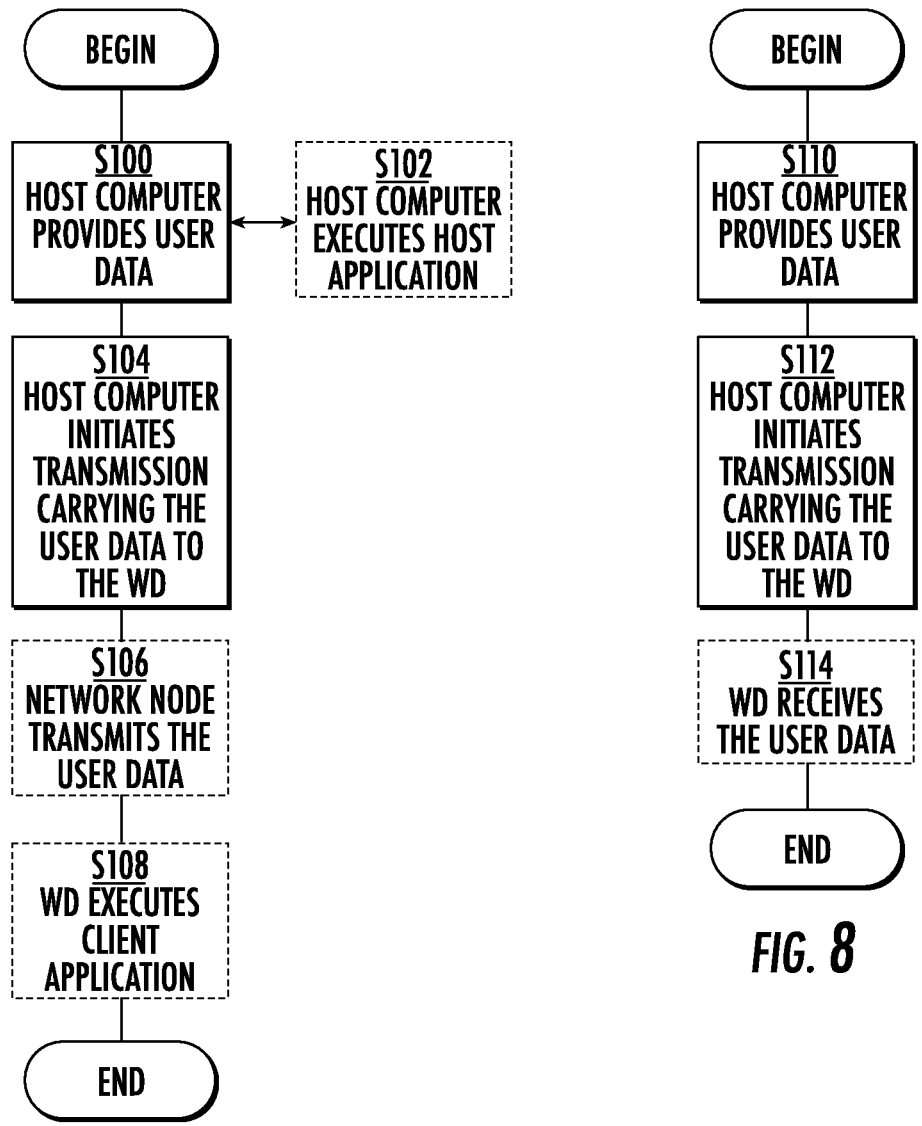

FIG. 7 is a flowchart illustrating an exemplary method implemented in a communication system, such as, for example, the communication system of FIGS. 1 and 2, in accordance with one embodiment. The communication system may include a host computer 24, a network node 16 and a wireless device 22, which may be those described with reference to FIG. 3. In a first step of the method, the host computer 24 provides user data (block S100). In an optional substep of the first step, the host computer 24 provides the user data by executing a host application, such as, for example, the host application 50 (block S102). In a second step, the host computer 24 initiates a transmission carrying the user data to the wireless device 22 (block S104). In an optional third step, the network node 16 transmits to the wireless device 22 the user data which was carried in the transmission that the host computer 22 initiated, in accordance with the teachings of the embodiments described throughout this disclosure (block S106). In an optional fourth step, the wireless device 22 executes a client application, such as, for example, the client application 114, associated with the host application 50 executed by the host computer 24 (block S108).

FIG. 8 is a flowchart illustrating an exemplary method implemented in a communication system, such as, for example, the communication system of FIG. 2, in accordance with one embodiment. The communication system may include a host computer 24, a network node 16 and a wireless device 22, which may be those described with reference to FIGS. 1 and 2. In a first step of the method, the host computer 24 provides user data (block S110). In an optional substep (not shown) the host computer 24 provides the user data by executing a host application 50, such as, for example, the host application 50. In a second step, the host computer 24 initiates a transmission carrying the user data to the wireless device 22 (block S112). The transmission may pass via the network node 16, in accordance with the teachings of the embodiments described throughout this disclosure. In an optional third step, the wireless device 22 receives the user data carried in the transmission (block S114).

FIG. 9 is a flowchart illustrating an exemplary method implemented in a communication system, such as, for example, the communication system of FIG. 2, in accordance with one embodiment. The communication system may include a host computer 24, a network node 16 and a wireless device 22, which may be those described with reference to FIGS. 1 and 2. In an optional first step of the method, the wireless device 22 receives input data provided by the host computer 24 (block S116). Additionally, or alternatively, in an optional second step, the wireless device 22 provides user data (block S120). In an optional substep of the second step, the wireless device provides the user data by executing a client application, such as, for example, client application 114 (block S118). In a further optional substep of the first step, the wireless device 22 executes the client application 114, which provides the user data in reaction to the received input data provided by the host computer 24 (block S122). In providing the user data, the executed client application 114 may further consider user input received from the user. Regardless of the specific manner in which the user data was provided, the wireless device 22 may initiate, in an optional third substep, transmission of the user data to the host computer 24 (block S124). In a fourth step of the method, the host computer 24 receives the user data transmitted from the wireless device 22, in accordance with the teachings of the embodiments described throughout this disclosure (block S126).

FIG. 10 is a flowchart illustrating an exemplary method implemented in a communication system, such as, for example, the communication system of FIG. 2, in accordance with one embodiment. The communication system may include a host computer 24, a network node 16 and a wireless device 22, which may be those described with reference to FIGS. 2 and 3. In an optional first step of the method, in accordance with the teachings of the embodiments described throughout this disclosure, the network node 16 receives user data from the wireless device 22 (block S128). In an optional second step, the network node 16 initiates transmission of the received user data to the host computer 24 (block S130). In a third step, the host computer 24 receives the user data carried in the transmission initiated by the network node 16 (block S132).

Figure 11:
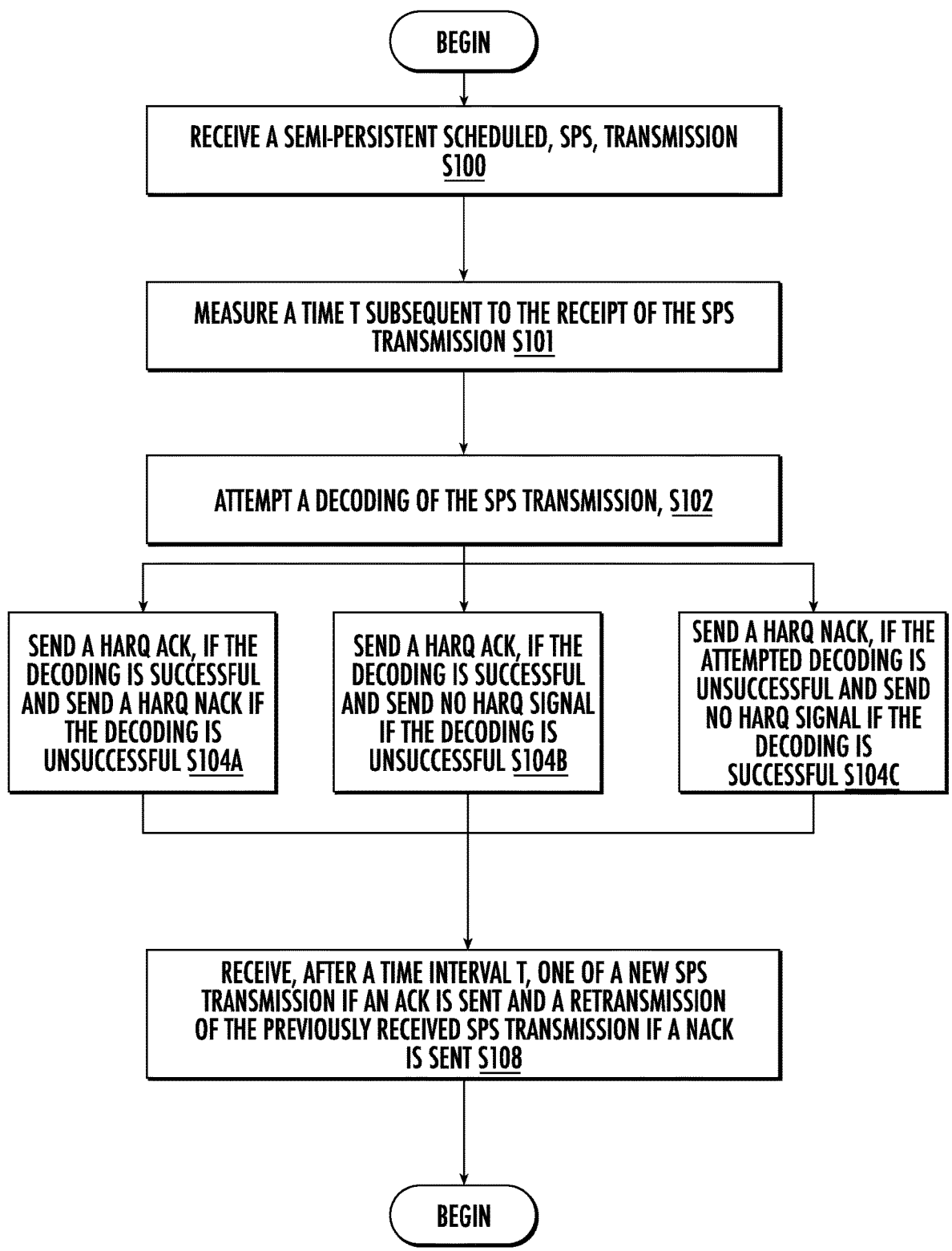
FIG. 11 is a flowchart of an exemplary process in a network node for processing HARQ transmissions according to some embodiments of the present disclosure.

FIG. 11 is a flowchart of an exemplary process in a network node 16 for processing HARQ transmissions. The process includes receiving a semi-persistent scheduled (SPS) transmission (block S100). The process also includes measuring a time, T, subsequent to receipt of the semi-persistent scheduled, SPS, transmission (block S101). The process also includes attempting a decoding of the SPS transmission (block S102). The process further includes performing one of three alternatives: (1) sending a hybrid automatic repeat request, HARQ, acknowledgement, ACK, if the attempted decoding is successful and sending a HARQ NACK if the decoding is unsuccessful (block S104A); (2) sending a HARQ ACK if decoding is successful and sending no HARQ signal when decoding is unsuccessful (block S104B); and (3) sending a HARQ NACK if decoding is unsuccessful and sending no HARQ signal if decoding is successful. (block S104C). The process also includes receiving, after the time T, one of a new SPS transmission if an ACK is sent and a retransmission of the previously received SPS transmission if a NACK is sent (block S108).

Figure 12:
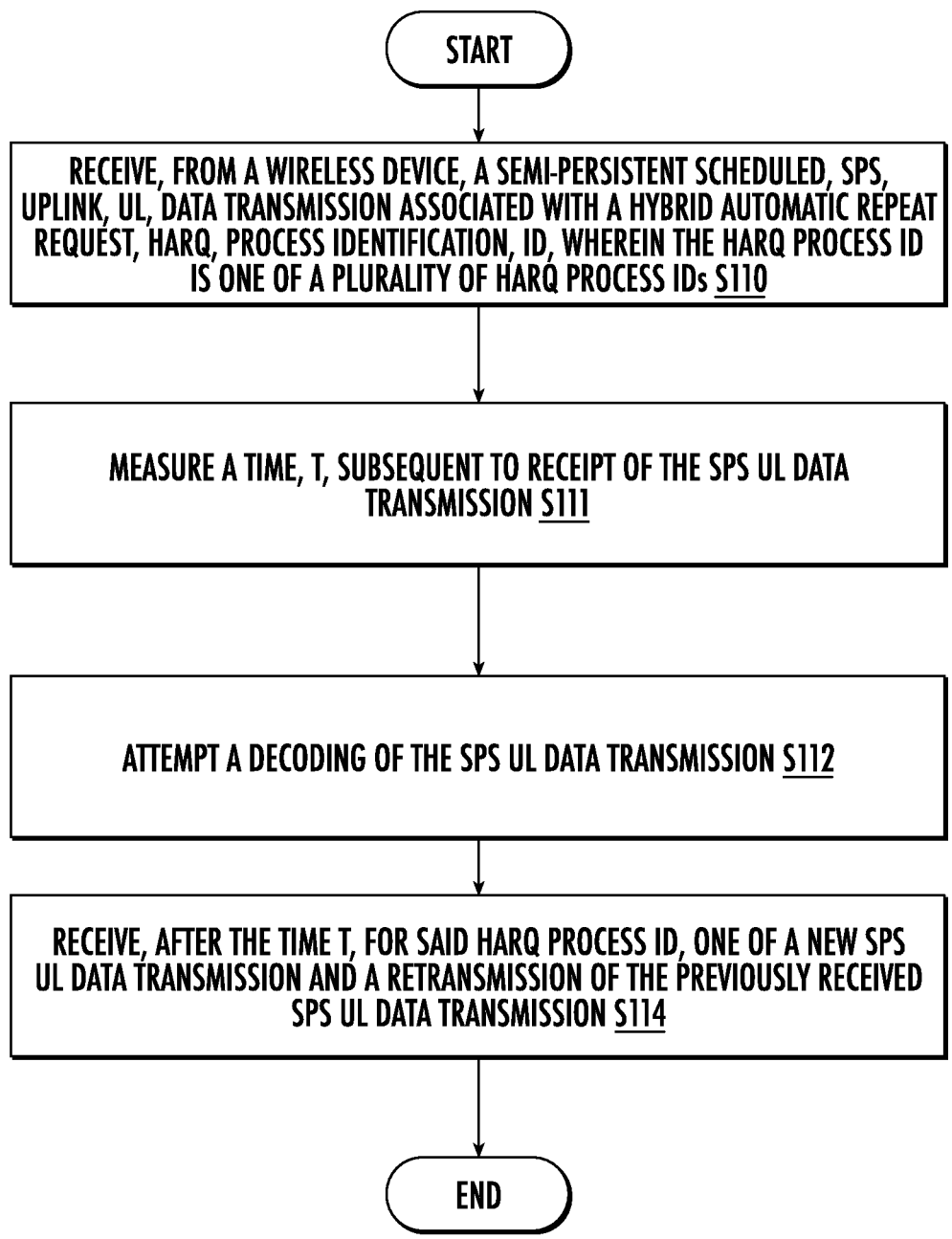
FIG. 12 is another flowchart of an exemplary process in a network node for processing HARQ transmissions according to some embodiments of the present disclosure.

FIG. 12 is a flowchart of another exemplary process in a network node for processing HARQ transmissions. The process includes receiving, via radio interface 62, from a wireless device 22, a semi-persistent scheduled, SPS, uplink, UL, data transmission associated with a hybrid automatic repeat request, HARQ, process identification, ID, wherein the HARQ process ID is one of a plurality of HARQ, process IDs (block S110). The process also includes measuring, via processing circuitry 68, a time, T, subsequent to receipt of the SPS UL data transmission (block S111). The process also includes attempting, via the processing circuitry 68, a decoding of the SPS UL data transmission (block S112). The process further includes receiving, via radio interface 62, after the time T, for said HARQ process ID, one of a new SPS UL data transmission and a retransmission of a previously received SPS UL data transmission (block S114).

Figure 13:
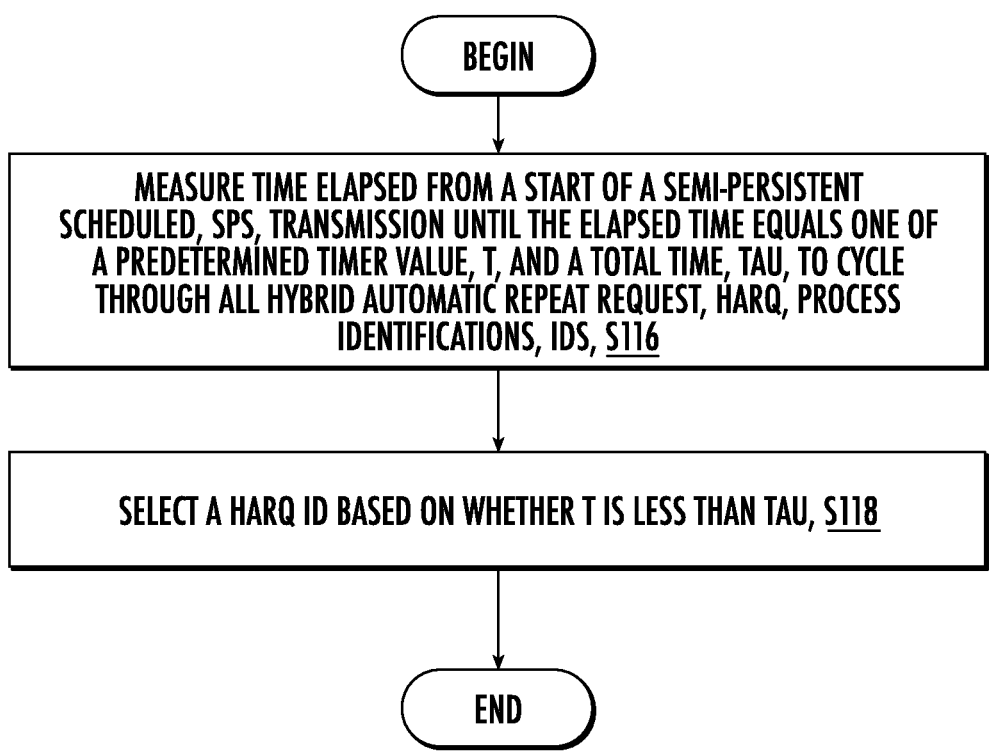
FIG. 13 is a flowchart of an exemplary process in a wireless device for processing HARQ transmissions according to some embodiments of the present disclosure.

FIG. 13 is a flowchart of an exemplary process in a wireless device 22 for processing HARQ transmissions. The process includes measuring time elapsed from a start of a semi-persistent scheduled, SPS, transmission until the elapsed time equals one of a predetermined timer value, T, and a total time, τ, to cycle through all hybrid automatic repeat request, HARQ, process identifications, IDs, (block S116). The process further includes selecting a HARQ ID based on whether T is less than τ (block S118).

Figure 14:
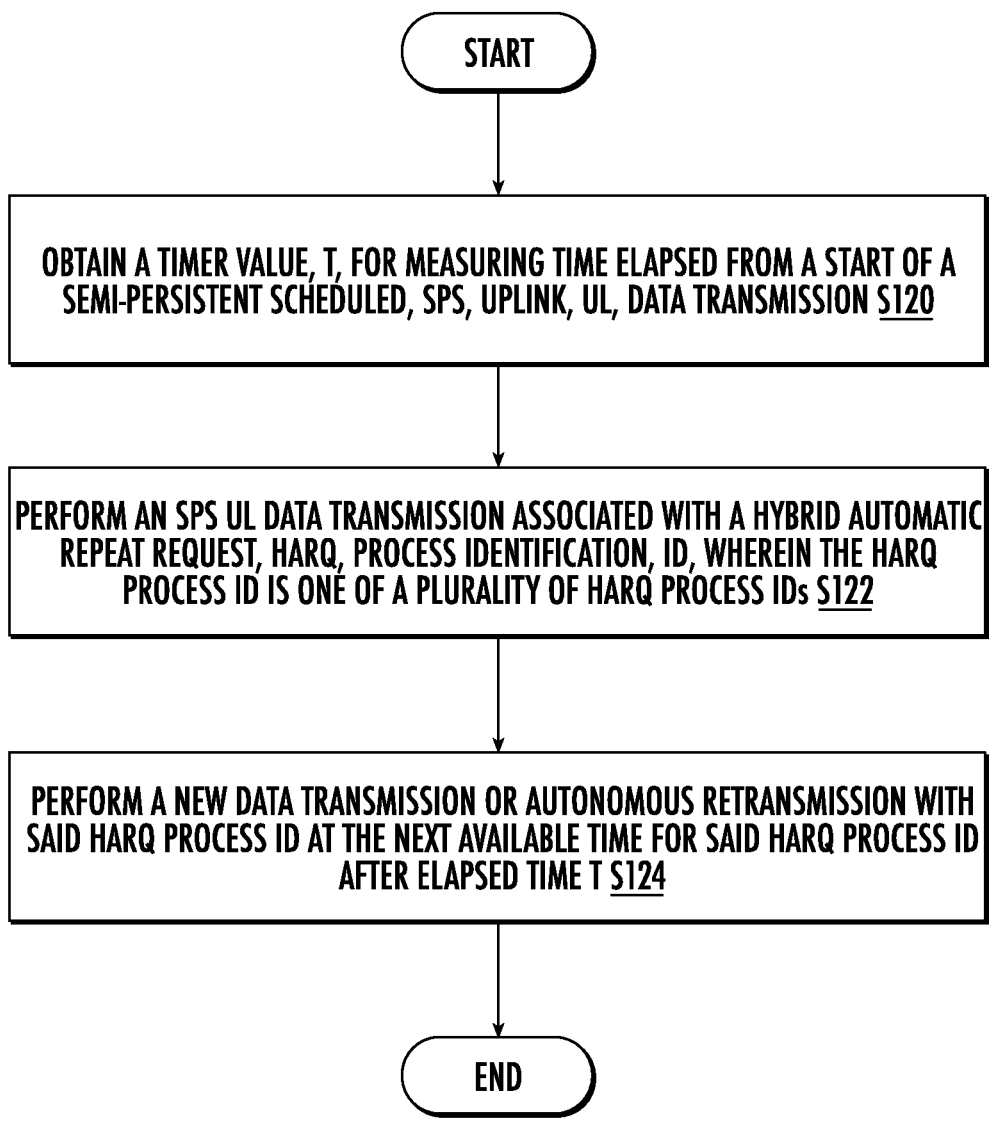
FIG. 14 is another flowchart of an exemplary process in a wireless device for processing HARQ transmissions according to some embodiments of the present disclosure.

FIG. 14 is a flowchart of an exemplary process in a wireless device 22 for processing HARQ transmissions. The process includes obtaining, via the radio interface 82, a timer value, T, for measuring time elapsed from a start of a semi-persistent scheduled, SPS, uplink, UL, data transmission (block S120). The process also includes performing, via the processing circuitry 84, an SPS UL data transmission associated with a hybrid automatic repeat request, HARQ, process identification, ID, wherein the HARQ process ID is one of a plurality of HARQ process IDs (block S122). The process further includes performing, via the processing circuitry 84, a new data transmission or autonomous retransmission with said HARQ process ID at the next available time for said HARQ process ID after elapsed time T (block S124).

Figure 15:
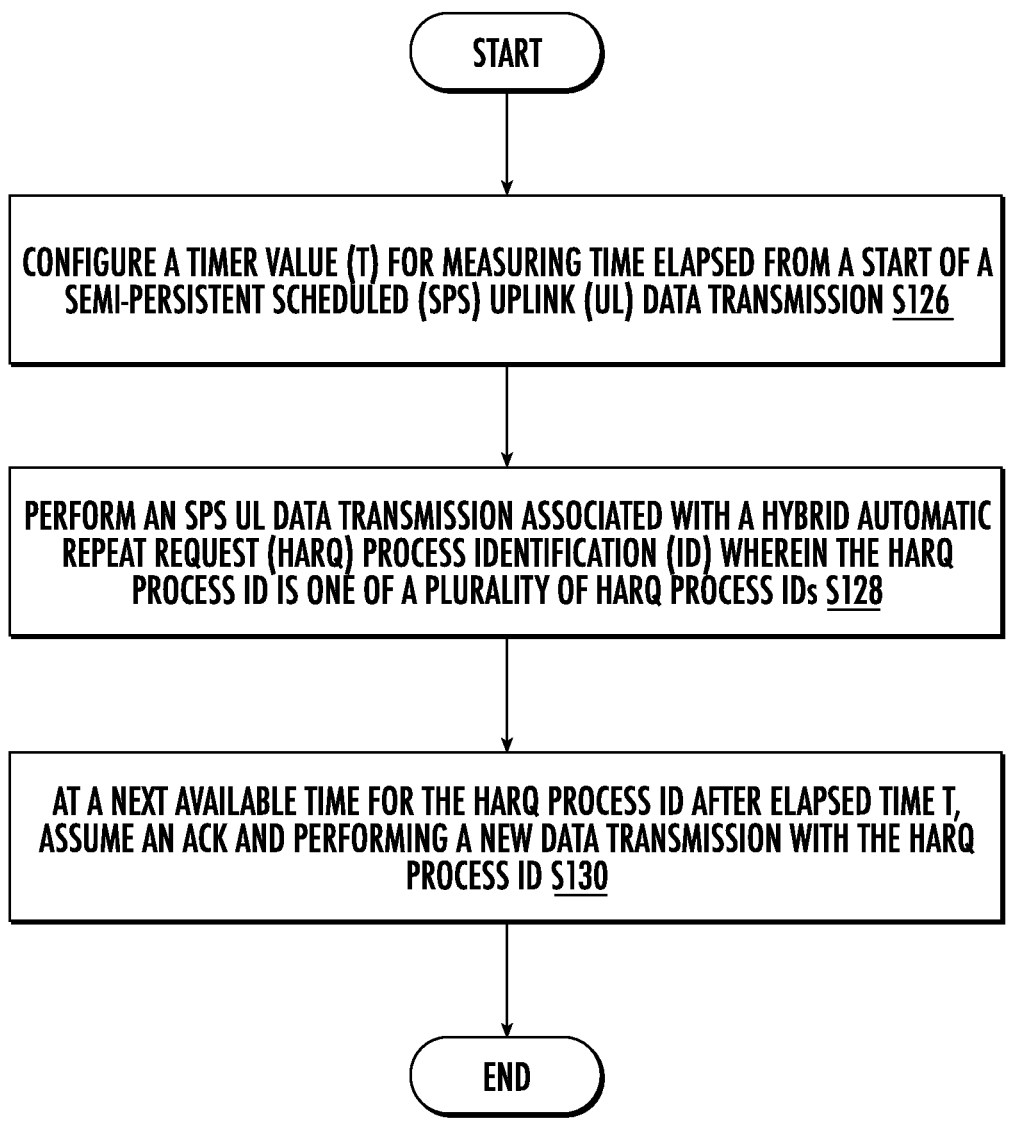
FIG. 15 is a flowchart of another exemplary process in a wireless device for processing HARQ transmissions according to some embodiments of the present disclosure.

FIG. 15 is a flowchart of another exemplary process in a wireless device 22 for processing HARQ transmissions. The process includes configuring, via a radio interface 82, a timer value (T) for measuring time elapsed from a start of a semi-persistent scheduled (SPS) uplink (UL) data transmission (block S126). The process also includes performing, via processing circuitry 84, an SPS UL data transmission associated with a hybrid automatic repeat request (HARQ) process identification (ID) wherein the HARQ process ID is one of a plurality of HARQ process IDs (block S128). The process further includes, assuming, via the processing circuitry 84, at a next available time for the HARQ process ID after elapsed time T, an ACK and performing a new data transmission with the HARQ process ID (block S130).

Figure 16:
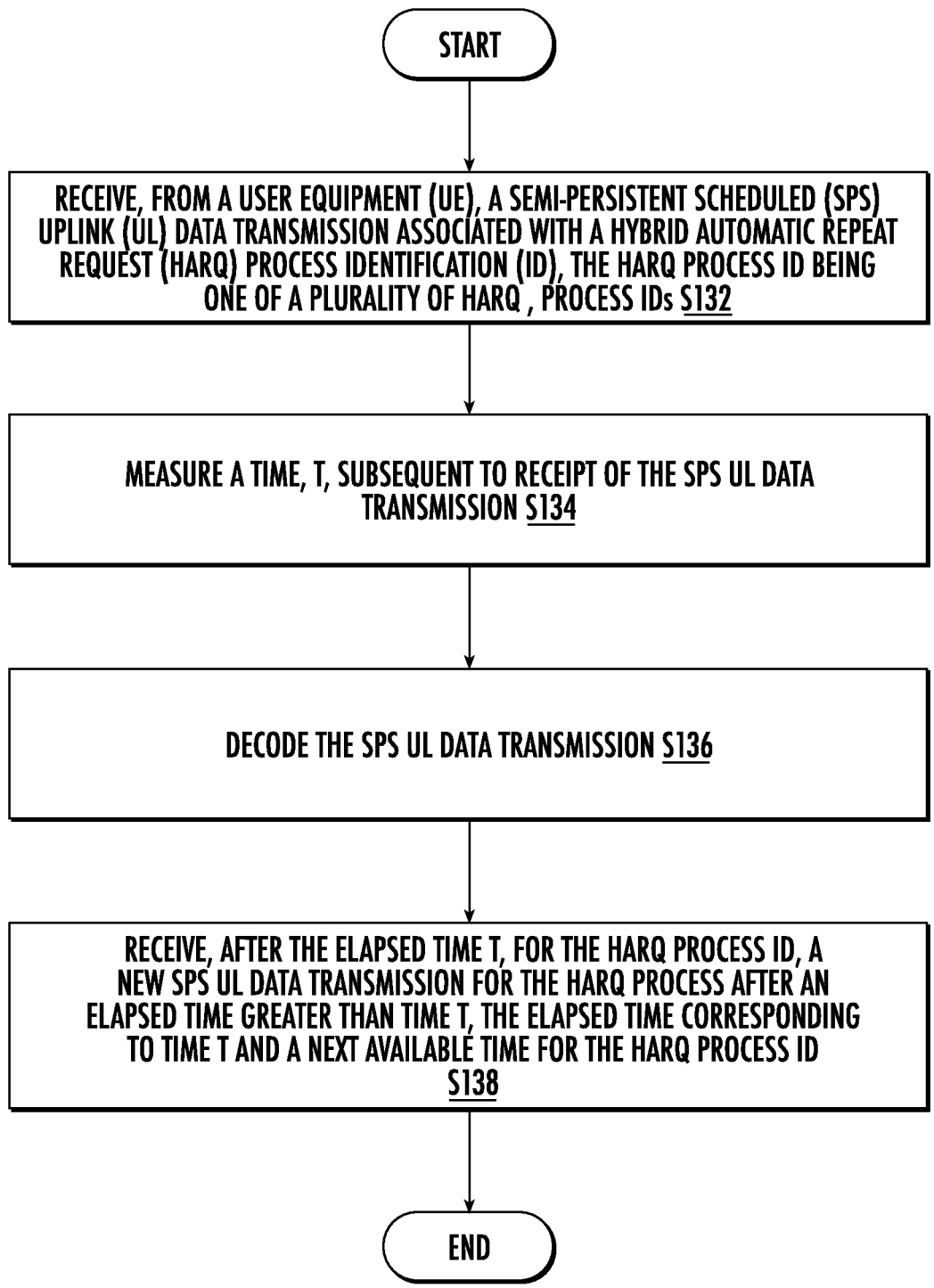
FIG. 16 is a flowchart of another exemplary process in a base station for processing HARQ transmissions according to some embodiments of the present disclosure.

FIG. 16 is a flowchart of another exemplary process in a base station 16 for processing HARQ transmissions. The process includes receiving, via the radio interface 62, from a UE 22, a semi-persistent scheduled (SPS) uplink (UL) data transmission associated with a hybrid automatic repeat request (HARQ) process identification (ID) wherein the HARQ process ID is one of a plurality of HARQ, process IDs (block S132). The process also includes measuring, via the processing circuitry 68, a time, T, subsequent to receipt of the SPS UL data transmission (block S134). The process also includes decoding, via the processing circuitry 68, the SPS UL data transmission (block S136). The process further includes sending, via the radio interface 62, an acknowledgement (ACK) to the UE (block S138). The process yet further includes receiving, via the radio interface 62, after the elapsed time T, for the HARQ process ID, a new SPS UL data transmission (block S140).

Having described the general process flow of arrangements of the disclosure and having provided examples of hardware and software arrangements for implementing the processes and functions of the disclosure, the sections below provide details and examples of arrangements for processing HARQ transmissions.

Embodiments provide a default wireless device behavior and a feedback timer value T. After the time T, the wireless device can assume an ACK of the corresponding HARQ and transmit new data if the wireless device's buffer is not empty, or the wireless device can assume an NACK of the corresponding HARQ and perform an autonomous retransmission.

Methods of adjusting the feedback timer value based on the time to cycle through the HARQ processes are described as follows:

According to a first method, a new feedback timer value is set to min(T,τ), which function returns the minimum of T and τ, and a default feedback behavior is specified. More specifically, if T≤τ, then the wireless device behavior is the default behavior which is: after time T, the wireless device can assume an ACK (a NACK in another alternative solution) and use the corresponding HARQ process ID for transmission of a new data packet (retransmission of the same data packet in the alternative solution). Note that the transmission of new data or autonomous retransmission happens at HARQ cycle time τ.

There are two possible assumptions if the wireless device has not received any feedback. One possible assumption is that the wireless device assumes ACK for the transport block (TB) and would at the next transmission occasion generate a new transport block for the given HARQ process. This would be applicable for example for the use case of enhanced mobile broadband (eMBB) wherein the reliability of receiving the transmission in the gNB may be relaxed. The other alternative is to assume a NACK and the wireless device would generate a retransmission of the TB at the next transmission occasion of the HARQ process. This could be applicable for an Ultra Reliable Low Latency Communication (URLLC) application where extreme reliability is desired.

The timer T could be defined from the point of transmitting the UL transmission or from the point of receiving the UL grant associated with timer T.

The feedback associated with the timer could be an ACK, a NACK, a new data indicator or a new grant. It follows that if NACK is received, either by itself or in the form of an UL grant scheduling a retransmission, the timer T is reset.

On the other hand, multiple HARQ processes can be used to transmit the new data while waiting for a maximum feedback time T. In such a case, each HARQ process would operate its own timer T. Further, the feedback timer T could also be set by the specification to a given value.

Figure 17:
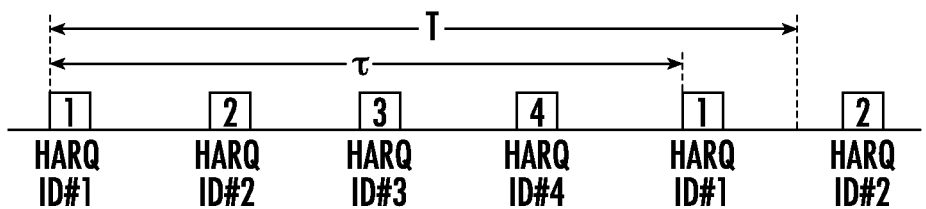
FIG. 17 is a diagram of successive HARQ IDs for T>τ.

On the other hand, and as illustrated in FIG. 17, if T>τ, then according to the above rule, the feedback timer expires after HARQ cycle T, which means that the feedback rule applies after HARQ cycle τ, i.e., the wireless device assumes ACK (NACK) at this time and continues the operation (transmission of new data or autonomous retransmission).

As another embodiment, two different behaviors can be specified depending on whether "T≤τ" or "T>τ".

According to a variant of this method, the new feedback timer is set to max(T,τ), which function returns the maximum of T and τ. If T≤τ, then the same behavior as described above occurs. A default interpretation is specified as the original timer at time T, but the action of whether transmission of new data or autonomous retransmission is applied occurs at HARQ cycle τ.

However, if T>τ, then according to a rule, the feedback timer expires at time T. The transmission of new data or autonomous retransmission happens at the next available time for the same HARQ ID after time T. No specific action is taken at the HARQ cycle τ or any other time instance when the same HARQ ID is configured to be transmitted within the timer T.

Similarly, as another embodiment, two different behaviors can be specified depending on whether "T≤τ" or "T>τ".

Figure 18:
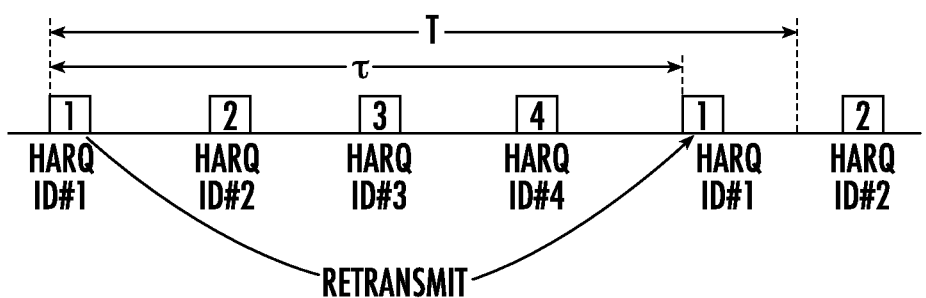
FIG. 18 is a diagram of successive HARQ IDs and shows retransmission after time interval τ.

Method of determining the retransmission behavior based on the time to cycle through the HARQ processes:

As shown in FIG. 18, the wireless device has different behaviors depending on the relation between the feedback timer (T) and the HARQ cycle (τ). If T≤τ, then there is no need to have the timer value T, and after HARQ cycle τ the wireless device assumes ACK (or NACK) and moves on to the next transmission (or retransmits the same packet) which is similar to the behavior described above with respect to the previous method. If T>τ, after HARQ cycle τ, the wireless device can be configured with one of the three following options.

1. The wireless device assumes that the UL transmission has been unsuccessful and retransmits at the HARQ cycle (τ) or retransmits at occasions between τ and T.

2. The wireless device assumes the UL transmission is successful, and new data can be transmitted.

3. The wireless device assumes no feedback, and keeps the data in the buffer. The behavior is specified at the time T.

Thus, according to one embodiment, a wireless device 22 includes a radio interface 82 configured to obtain a timer value, T, for measuring time elapsed from a start of a semi-persistent scheduled, SPS, uplink, UL, data transmission. The WD 22 also includes processing circuitry 84 configured to perform an SPS UL data transmission associated with a hybrid automatic repeat request, HARQ, process identification, ID, wherein the HARQ process ID is one of a plurality of HARQ process IDs, and perform a new data transmission or autonomous retransmission with said HARQ process ID at the next available time for said HARQ process ID after elapsed time T.

According to this aspect, in some embodiments, the processing circuitry 84 is further configured to assume one of an acknowledgement, ACK, and non-acknowledgment, NACK for the SPS UL data transmission with said HARQ process ID at the next available time for said HARQ process ID after elapsed time T. In some embodiments, the next available time after elapsed time T occurs after the larger of the obtained timer value, T, and a total time, τ, to cycle through the plurality of HARQ process IDs for SPS UL data transmissions. In some embodiments, the processing circuitry 84 is further configured to, at the next available time for said HARQ process ID after elapsed time T, assume an ACK and perform a new data transmission with said HARQ process ID. In some embodiments, the processing circuitry 84 is further configured to measure time elapsed from a start of the SPS UL data transmission until the elapsed time equals one of the obtained value, T, and the total time, $\tau$, to cycle through the plurality of HARQ process IDs for SPS UL data transmissions. In some embodiments, if T is less than $\tau$, then the next available time for said HARQ process ID occurs after time $\tau$; and if T is greater than $\tau$, then next available time for said HARQ process ID occurs after elapsed time T and up to T+$\tau$. In some embodiments, a feedback timer is set to the lesser of T and $\tau$ and when T is less than $\tau$, then, after elapsed time T, the wireless device 22 assumes an ACK and uses a corresponding HARQ process ID for one of transmission of a new data packet and retransmission of a same data packet at the time $\tau$.

According to another aspect, a method for performing uplink transmissions, implemented by a wireless device 22 is provided. The method includes obtaining (S120) a timer value, T, for measuring time elapsed from a start of a semi-persistent scheduled, SPS, uplink, UL, data transmission. The method includes performing (S122) an SPS UL data transmission associated with a hybrid automatic repeat request, HARQ, process identification, ID, wherein the HARQ process ID is one of a plurality of HARQ process IDs. The method also includes performing (S124) a new data transmission or autonomous retransmission with said HARQ process ID at the next available time for said HARQ process ID after elapsed time T. In some embodiments, the method further includes assuming one of an acknowledgement, ACK, and non-acknowledgment, NACK for the SPS UL data transmission with said HARQ process ID at the next available time for said HARQ process ID after elapsed time T. In some embodiments, the next available time after elapsed time T occurs after the larger of the obtained timer value, T, and a total time, $\tau$, to cycle through the plurality of HARQ process IDs for SPS UL data transmissions. In some embodiments, the method further includes at the next available time for said HARQ process ID after elapsed time T, assuming an ACK and performing a new data transmission with said HARQ process ID. In some embodiments, the method further includes measuring time elapsed from a start of the SPS UL data transmission until the elapsed time equals one of the obtained value, T, and the total time, $\tau$, to cycle through the plurality of HARQ process IDs for SPS UL data transmissions. In some embodiments, if T is less than $\tau$, then the next available time for said HARQ process ID occurs after $\tau$; and if T is greater than $\tau$, then the next available time for said HARQ process ID occurs after elapsed time T and up to T+$\tau$. In some embodiments, a feedback timer is set to the lesser of T and $\tau$ and: when T is less than $\tau$, then, after elapsed time T, the wireless device (22) assumes an ACK and uses a corresponding HARQ process ID for one of transmission of a new data packet and retransmission of a same data packet at the time $\tau$.

According to yet another aspect, a network node includes a radio interface 62 configured to receive, from a wireless device 22, a semi-persistent scheduled, SPS, uplink, UL, data transmission associated with a hybrid automatic repeat request, HARQ, process identification, ID, wherein the HARQ process ID is one of a plurality of HARQ process IDs. The network node also includes processing circuitry 68 configured to: measure a time, T, subsequent to receipt of the SPS UL data transmission; attempt a decoding of the SPS UL data transmission; and receive, after the elapsed time T, for said HARQ process ID, one of a new SPS UL data transmission and a retransmission of the previously received SPS UL data transmission.

According to this aspect, in some embodiments, the processing circuitry 68 is further configured to not send, to the wireless device 22, an Ack for the received SPS UL data transmission when the attempted decoding is successful and receive, after the elapsed time T, a new SPS UL data transmission for said HARQ process ID. In some embodiments, the received new SPS UL data transmission for said HARQ process occurs after an elapsed time greater than time T wherein the elapsed time corresponds to a time, $\tau$, during which the wireless device 22 cycles through the plurality of HARQ, process IDs for SPS UL data transmission. In some embodiments, the received new SPS UL data transmission for said HARQ process occurs after an elapsed time greater than time T wherein the elapsed time corresponds to time T and next available time for said HARQ process ID.

According to another aspect, a method implemented by a network node 16 is provided. The method includes receiving (S110), from a wireless device 22, a semi-persistent scheduled, SPS, uplink, UL, data transmission associated with a hybrid automatic repeat request, HARQ, process identification, ID, wherein the HARQ process ID is one of a plurality of HARQ process IDs. The method also includes measuring (S111) a time, T, subsequent to receipt of the SPS UL data transmission. The method also includes attempting (S112) a decoding of the SPS UL data transmission. The method further includes receiving (S114), after the time T, for said HARQ process ID, one of a new SPS UL data transmission and a retransmission of the previously received SPS UL data transmission.

According to this aspect, in some embodiments, the method includes not sending to the wireless device 22 an Ack for the received SPS UL data transmission when the attempted decoding is successful and receiving, after the time T a new SPS UL data transmission for said HARQ process ID. In some embodiments, receiving the new SPS UL data transmission for said HARQ process occurs after an elapsed time greater than time T wherein the elapsed time corresponds to a time, $\tau$, during which the wireless device 22 cycles through the plurality of HARQ, process IDs for SPS UL data transmissions. In some embodiments, the received new SPS UL data transmission for said HARQ process occurs after an elapsed time greater than time T wherein the elapsed time corresponds to time T and a next available time for said HARQ process ID.

According to another aspect, a wireless device, comprising instructions which when executed on a processor cause the wireless device to perform any one of the methods described above. According to yet another aspect, a network node, comprising instructions which when executed on a processor cause the network node to perform any one of the methods described above. According to another aspect, a computer program product or storage media, comprising memory 72, 88 comprising instructions which when executed on a processor 70, 86 cause the processor 70, 86 to perform any one of the methods described above.

According to yet another aspect, a user equipment (UE) 22 includes a radio interface 82 configured with a timer value (T) for measuring time elapsed from a start of a semi-persistent scheduled (SPS) uplink (UL) data transmission. The UE also includes processing circuitry 84 configured to perform an SPS UL data transmission associated with a hybrid automatic repeat request (HARQ) process identification (ID) wherein the HARQ process ID is one of a plurality of HARQ process IDs. The processing circuitry 84 is also configured to, at a next available time for the HARQ process ID after elapsed time T, assume an acknowledgement (ACK) and perform a new data transmission with the HARQ process ID.

According to this aspect, in some embodiments, the next available time after elapsed time T occurs after the larger of the obtained timer value T and a total time ($\tau$) to cycle through the plurality of HARQ process IDs for SPS UL data transmissions. In some embodiments, the processing circuitry is further configured to measure time elapsed from a start of the SPS UL data transmission until the elapsed time equals one of the obtained timer value T and the total time ($\tau$) to cycle through the plurality of HARQ process IDs for SPS UL data transmissions. In some embodiments, if T is less than $\tau$, then the next available time for the HARQ process ID occurs after time $\tau$; and if T is greater than $\tau$, then next available time for the HARQ process ID occurs after elapsed time T and up to T+$\tau$. In some embodiments, a feedback timer is set to the lesser of T and $\tau$ and when T is less than $\tau$, then, after elapsed time T, the UE 22 assumes an ACK and uses a corresponding HARQ process ID for transmission of a new data packet at the time $\tau$.

According to another aspect, a method for performing uplink transmissions, implemented by a user equipment (UE) 22 is provided. The method includes configuring a timer value (T) for measuring time elapsed from a start of a semi-persistent scheduled (SPS) uplink (UL) data transmission. The method also includes performing an SPS UL data transmission associated with a hybrid automatic repeat request (HARQ) process identification (ID) wherein the HARQ process ID is one of a plurality of HARQ process IDs. The method further includes, at a next available time for the HARQ process ID after elapsed time T, assuming an ACK and performing a new data transmission with the HARQ process ID.

According to this aspect, in some embodiments, the next available time after elapsed time T occurs after the larger of the obtained timer value (T) and a total time ($\tau$) to cycle through the plurality of HARQ process IDs for SPS UL data transmissions. In some embodiments, the method further includes measuring time elapsed from a start of the SPS UL data transmission until the elapsed time equals one of the obtained value (T) and the total time ($\tau$) to cycle through the plurality of HARQ process IDs for SPS UL data transmissions. In some embodiments, if T is less than $\tau$, then the next available time for the HARQ process ID occurs after $\tau$; and if T is greater than $\tau$, then the next available time for the HARQ process ID occurs after elapsed time T and up to T+$\tau$. In some embodiments, a feedback timer is set to the lesser of T and $\tau$ and: when T is less than $\tau$, then, after elapsed time T, the UE 22 assumes an ACK and uses a corresponding HARQ process ID for transmission of a new data packet at the time $\tau$.

According to another aspect, a base station 16 is provided. The base station 16 includes a radio interface 62 configured to receive, from a UE 22, a semi-persistent scheduled (SPS) uplink (UL) data transmission associated with a hybrid automatic repeat request (HARQ) process identification (ID) the HARQ process ID being one of a plurality of HARQ, process IDs. The base station 16 further includes processing circuitry 68 configured to: measure a time, T, subsequent to receipt of the SPS UL data transmission; decode the SPS UL data transmission; and receive a new SPS UL data transmission for the HARQ process after an elapsed time greater than time T, the elapsed time corresponding to time T and a next available time for the HARQ process ID.

According to this aspect, in some embodiments, the next available time for the HARQ process ID corresponds to a time, $\tau$, during which the UE cycles through the plurality of HARQ, process IDs for SPS UL data transmission.

According to another aspect, a method for receiving uplink transmissions, implemented by a base station 16 is provided. The method includes receiving (S132), from a UE 22, a semi-persistent scheduled (SPS) uplink (UL) data transmission associated with a hybrid automatic repeat request (HARQ) process identification (ID), the HARQ process ID being one of a plurality of HARQ, process IDs. The method also includes measuring a time, T, subsequent to receipt of the SPS UL data transmission (S134), decoding the SPS UL data transmission (S136) and receiving, after the elapsed time T, for the HARQ process ID, a new SPS UL data transmission for the HARQ process after an elapsed time greater than time T, the elapsed time corresponding to time T and a next available time for the HARQ process ID (S138).

According to this aspect, in some embodiments, the next available time for the HARQ process ID corresponds to a time, $\tau$, during which the UE cycles through the plurality of HARQ, process IDs for SPS UL data transmission.

Some examples include:

Example A1. A wireless device, wireless device, configured to communicate with a network node, the wireless device comprising a radio interface and processing circuitry configured to:

measure time elapsed from a start of a semi-persistent scheduled, SPS, transmission until the elapsed time equals one of a predetermined timer value, T, and a total time, $\tau$, to cycle through the hybrid automatic repeat request, HARQ, process identifications, IDs; and select a HARQ ID based on whether T is less than $\tau$.

Example A2. The wireless device of Example A1, wherein:

the measured time elapsed is the lesser of T and $\tau$; and if T is less than $\tau$, then the processing circuitry is further configured to perform a first procedure, the first procedure including:

assuming one of an acknowledgement, ACK, and non-acknowledgment, NACK, after T; and selecting a HARQ ID corresponding to the time T; and if T is greater than $\tau$, then the processing circuitry is further configured to perform a second procedure, the second procedure including:

assuming one of an acknowledgement, ACK, and non-acknowledgment, NACK, after time $\tau$; and selecting a HARQ ID corresponding to the time $\tau$.

Example A3. The wireless device of Example A1, wherein:

the measured time elapsed is the greater of T and $\tau$; and if T is less than $\tau$, then the processing circuitry is configured to perform a first procedure, the first procedure including:

assuming one of an acknowledgement, ACK, and non-acknowledgment, NACK, after T; and selecting a HARQ ID corresponding to the time $\tau$; and if T is greater than $\tau$, then the processing circuitry is further configured to perform a second procedure, the second procedure including:

assuming one of an acknowledgement, ACK, and non-acknowledgment, NACK, after time $\tau$; and selecting a HARQ ID corresponding to the time T.

Example A4: The wireless device of Example A1, wherein:

if T is less than τ, then the processing circuitry is configured to perform a first procedure, the first procedure including:
    assuming one of acknowledgment, ACK, and non-acknowledgement, NACK, after time τ; and
    selecting a HARQ ID corresponding to the time τ; and
    if T is greater than τ, then the processing circuitry is further configured to perform a second procedure, the second procedure includes one of the following:
        assuming the transmission has been unsuccessful and retransmitting at one of a HARQ cycle corresponding to τ and at a time between τ and T;
        assuming the transmission is successful and transmitting new data; and
        assuming no HARQ feedback and keeping data in a buffer.

Example B1. A communication system including a host computer, the host computer comprising:
    a communication interface configured to receive user data originating from a transmission from a wireless device to a network node,
    wherein the wireless device comprises a radio interface and processing circuitry, the wireless device's processing circuitry configured to:
        measure time elapsed from a start of a semi-persistent scheduled, SPS, transmission until the elapsed time equals one of a predetermined timer value, T, and a total time, τ, to cycle through the hybrid automatic repeat request, HARQ, process identifications, IDs; and
        select a HARQ ID based on whether T is less than τ.

Example B2. The communication system of Example B1, further including the wireless device.

Example B3. The communication system of Example B2, further including the network node, wherein the network node comprises a radio interface configured to communicate with the wireless device and a communication interface configured to forward to the host computer the user data carried by a transmission from the wireless device to the network node.

Example B4. The communication system of Example B2 or B3, wherein:
    the processing circuitry of the host computer is configured to execute a host application; and
    the wireless device's processing circuitry is configured to execute a client application associated with the host application, thereby providing the user data.

Example B5. The communication system of Example B2 or B3, wherein:
    the processing circuitry of the host computer is configured to execute a host application, thereby providing request data; and
    the wireless device's processing circuitry is configured to execute a client application associated with the host application, thereby providing the user data in response to the request data.

Example C1. A method implemented in a wireless device, the method comprising:
    measuring time elapsed from a start of a semi-persistent scheduled, SPS, transmission until the elapsed time equals one of a predetermined timer value, T, and a total time, τ, to cycle through the hybrid automatic repeat request, HARQ, process identifications, IDs;
    selecting a HARQ ID based on whether T is less than τ.

Example C2. The method of Example C1, wherein:
    the measured time elapsed is the lesser of T and τ; and
    if T is less than τ, then the processing circuitry is further configured to perform a first procedure, the first procedure including:
        assuming one of an acknowledgement, ACK, and non-acknowledgment, NACK, after T; and
        selecting a HARQ ID corresponding to the time T; and
    if T is greater than τ, then the processing circuitry is further configured to perform a second procedure, the second procedure including:
        assuming one of an acknowledgement, ACK, and non-acknowledgment, NACK, after time τ; and
        selecting a HARQ ID corresponding to the time τ.

Example C3. The method of Example C1, wherein:
    the measured time elapsed is the greater of T and τ; and
    if T is less than τ, then the processing circuitry is configured to perform a first procedure, the first procedure including:
        assuming one of an acknowledgement, ACK, and non-acknowledgment, NACK, after T; and
        selecting a HARQ ID corresponding to the time τ; and
    if T is greater than τ, then the processing circuitry is further configured to perform a
    second procedure, the second procedure including:
        assuming one of an acknowledgement, ACK, and non-acknowledgment, NACK, after time τ; and
        selecting a HARQ ID corresponding to the time T.

Example C4. The method of Example C1, wherein:
    if T is less than τ, then the processing circuitry is configured to perform a first procedure, the first procedure including:
        assuming one of acknowledgment, ACK, and non-acknowledgement, NACK, after time τ; and
        selecting a HARQ ID corresponding to the time τ; and
    if T is greater than τ, then the processing circuitry is further configured to perform a second procedure, the second procedure includes one of the following:
        assuming the transmission has been unsuccessful and retransmitting data of the transmission at one of a HARQ cycle corresponding to τ and at a time between τ and τ;
        assuming the transmission is successful and transmitting new data after time T; and
        assuming no HARQ feedback and keeping data in a buffer.

Example C5. The method of Example C1, further comprising:
    providing user data; and
    forwarding the user data to a host computer via the transmission to the network node.

Example D1. A method implemented in a communication system including a host computer, a network node and a wireless device, the method comprising:
    at the host computer, receiving user data transmitted to the network node from the wireless device, wherein the wireless device:
        measures time elapsed from a start of a semi-persistent scheduled, SPS, transmission until the elapsed time equals one of a predetermined timer value, T, and a total time, τ, to cycle through the hybrid automatic repeat request, HARQ, process identifications, IDs;
        selects a HARQ ID based on whether T is less than τ.

Example D2. The method of Example D1, further comprising, at the wireless device, providing the user data to the network node.

Example D3. The method of Example D2, further comprising:

at the wireless device, executing a client application, thereby providing the user data to be transmitted; and at the host computer, executing a host application associated with the client application.

Example D4. The method of Example D2, further comprising:

at the wireless device, executing a client application; and at the wireless device, receiving input data to the client application, the input data being provided at the host computer by executing a host application associated with the client application, wherein the user data to be transmitted is provided by the client application in response to the input data.

Example E1. A network node configured to communicate with a wireless device, the network node comprising a radio interface and processing circuitry configured to:

receive a semi-persistent scheduled, SPS, transmission;

measure a time, T, subsequent to receipt of the semi-persistent scheduled, SPS, transmission;

attempt a decoding of the SPS transmission;

perform one of:

sending a hybrid automatic repeat request, HARQ, acknowledgement, ACK, if the attempted decoding is successful and sending a HARQ non-acknowledgment, NACK if the attempted decoding is unsuccessful;

sending a HARQ ACK if the attempted decoding is successful and sending no HARQ signal if the attempted decoding is unsuccessful; and sending a HARQ NACK if the attempted decoding is unsuccessful and sending no HARQ signal if the attempted decoding is successful; and receive, after the time T, one of a new SPS transmission if an ACK is sent and a retransmission of the previously received SPS transmission if a NACK is sent.

Example E2. The network node of Example E1, wherein T is less than a total time, τ, to cycle through the hybrid automatic repeat request, HARQ, process identifications, IDs.

Example E3. The network node of Example E1, wherein T is greater than a total time, τ, to cycle through the hybrid automatic repeat request, HARQ, process identifications, IDs.

Example F1. A communication system including a host computer, the host computer comprising: a communication interface configured to receive user data originating from a transmission from a wireless device to a network node, the network node comprising a radio interface and processing circuitry, the network node's processing circuitry configured to:

receive a semi-persistent scheduled, SPS, transmission;

measure a time, T, subsequent to receipt of the semi-persistent scheduled, SPS, transmission;

attempt a decoding of the SPS transmission;

perform one of:

sending a hybrid automatic repeat request, HARQ, acknowledgement, ACK, if the attempted decoding is successful and sending a HARQ non-acknowledgment, NACK if the attempted decoding is unsuccessful;

sending a HARQ ACK if the attempted decoding is successful and sending no HARQ signal if the attempted decoding is unsuccessful; and sending a HARQ NACK if the attempted decoding is unsuccessful and sending no HARQ signal if the attempted decoding is successful; and receive, after the time T, one of a new SPS transmission if an ACK is sent and a retransmission of the previously received SPS transmission if a NACK is sent.

Example F2. The communication system of Example F1, further including the network node.

Example F3. The communication system of Example F2, further including the wireless device, wherein the wireless device is configured to communicate with the network node.

Example F4. The communication system of Example F3, wherein:

the processing circuitry of the host computer is configured to execute a host application; and the wireless device is configured to execute a client application associated with the host application, thereby providing the user data to be received by the host computer.

Example G1. A method implemented in a network node, the method comprising:

receiving a semi-persistent scheduled, SPS, transmission;

measuring a time, T, subsequent to receipt of the semi-persistent scheduled, SPS, transmission;

attempting a decoding of the SPS transmission;

performing one of:

sending a hybrid automatic repeat request, HARQ, acknowledgement, ACK, if the attempted decoding is successful and sending a HARQ non-acknowledgment, NACK if the attempted decoding is unsuccessful;

sending a HARQ ACK if the attempted decoding is successful and sending no HARQ signal if the attempted decoding is unsuccessful; and sending a HARQ NACK if the attempted decoding is unsuccessful and sending no HARQ signal if the attempted decoding is successful; and receiving, after the time T, one of a new SPS transmission if an ACK is sent and a retransmission of the previously received SPS transmission if a NACK is sent.

Example G2. The network node of Example G1, wherein T is less than a total time, τ, to cycle through the hybrid automatic repeat request, HARQ, process identifications, IDs.

Example G3. The network node of Example G1, wherein T is greater than a total time, τ, to cycle through the hybrid automatic repeat request, HARQ, process identifications, IDs.

Example H1. A method implemented in a communication system including a host computer, a network node and a wireless device, the method comprising:

at the host computer, receiving, from the network node, user data originating from a transmission which the network node has received from the wireless device, wherein the network node is configured to:

receive a semi-persistent scheduled, SPS, transmission;

measure a time, T, subsequent to receipt of the semi-persistent scheduled, SPS, transmission;

attempt a decoding of the SPS transmission;

perform one of:

sending a hybrid automatic repeat request, HARQ, acknowledgement, ACK, if the attempted decoding is successful and sending a HARQ non-acknowledgment, NACK if the attempted decoding is unsuccessful;

sending a HARQ ACK if an attempted decoding is successful and sending no HARQ signal if the attempted decoding is unsuccessful; and sending a HARQ non-acknowledgment, NACK, if the attempted decoding is unsuccessful and sending no HARQ signal if the attempted decoding is successful; and receive, after the time T, one of a new SPS transmission if an ACK is sent and a retransmission of the previously received SPS transmission if a NACK is sent.

Example H2. The method of Example H1, further comprising, at the network node, receiving the user data from the wireless device.

Example H3. The method of Example H2, further comprising, at the network node, initiating a transmission of the received user data to the host computer.

Example I1. A wireless device, comprising:
  a memory module configured to store timer value T;
  a timer module configured to measure time elapsed from a start of a semi-persistent scheduled, SPS, transmission until the elapsed time equals one of a predetermined timer value, T, and a total time, τ, to cycle through the hybrid automatic repeat request, HARQ, process identifications, IDs; and
  a selection module configured to select a HARQ ID based on whether T is less than τ.

Example I2. A network node, comprising:
  a memory module configured to store a time T;
  a timer module configured to measure the time, T, subsequent to receipt of a semi-persistent scheduled, SPS, transmission; and
  a radio interface module configured to:
  receive the SPS transmission;
  perform one of:
    sending a hybrid automatic repeat request, HARQ, acknowledgement, ACK, if the attempted decoding is successful and sending a HARQ non-acknowledgment, NACK if the attempted decoding is unsuccessful;
    sending a HARQ ACK if an attempted decoding is successful and sending no HARQ signal if the attempted decoding is unsuccessful; and
    sending a HARQ non-acknowledgment, NACK, if the attempted decoding is unsuccessful and sending no HARQ signal if the attempted decoding is successful; and
  receive, after the time T, one of a new SPS transmission if an ACK is sent and a retransmission of the previously received SPS transmission if a NACK is sent.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:
  NR Next Radio
  LTE Long term evolution
  SPS Semi-Persistent Scheduling
  HARQ Hybrid automatic repeat request
  TTI Transmission time interval
  PID Process IDentfication
  PHICH Physical Hybrid-ARQ Indicator Channel It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A user equipment (UE) comprising:
a radio interface configured with a timer value (T) for measuring time elapsed from a start of a semi-persistent scheduled (SPS) uplink (UL) data transmission; and
processing circuitry configured to:
perform an SPS UL data transmission associated with a hybrid automatic repeat request (HARQ) process identification (ID), the HARQ process ID being one of a plurality of HARQ process IDs; and
at a next available time for the HARQ process ID, assume an acknowledgement (ACK) and perform a new data transmission with the HARQ process ID, the next available time occurring after a larger of the timer value T and a total time ($\tau$) to cycle through the plurality of HARQ process IDs for SPS UL data transmissions.

2. The UE of claim 1, wherein the processing circuitry is further configured to measure time elapsed from a start of the SPS UL data transmission until the elapsed time equals one of the timer value T and the total time ($\tau$) to cycle through the plurality of HARQ process IDs for SPS UL data transmissions.

3. The UE of claim 1, wherein:
if T is less than $\tau$, then the next available time for the HARQ process ID occurs after time $\tau$; and
if T is greater than $\tau$, then the next available time for the HARQ process ID occurs after elapsed time T and up to T+$\tau$.

4. The UE of claim 1, wherein a feedback timer is set to the lesser of T and $\tau$ and:
when T is less than $\tau$, then, after elapsed time T, the UE assumes an ACK and uses a corresponding HARQ process ID for transmission of a new data packet at the time $\tau$.

5. A method for performing uplink transmissions, implemented by a user equipment (UE), the method comprising:
configuring a timer value (T) for measuring time elapsed from a start of a semi-persistent scheduled (SPS) uplink (UL) data transmission;
performing an SPS UL data transmission associated with a hybrid automatic repeat request (HARQ) process identification (ID), the HARQ process ID being one of a plurality of HARQ process IDs; and
at a next available time for the HARQ process ID, assuming an ACK and performing a new data transmission with the HARQ process ID, the next available time occurring after a larger of the timer value (T) and a total time ($\tau$) to cycle through the plurality of HARQ process IDs for SPS UL data transmissions.

6. The method of claim 5, further comprising measuring time elapsed from a start of the SPS UL data transmission until the elapsed time equals one of the timer value (T) and the total time ($\tau$) to cycle through the plurality of HARQ process IDs for SPS UL data transmissions.

7. The method of claim 5, wherein:
if T is less than $\tau$, then the next available time for the HARQ process ID occurs after $\tau$; and
if T is greater than $\tau$, then the next available time for the HARQ process ID occurs after elapsed time T and up to T+$\tau$.

8. The method of claim 5, wherein a feedback timer is set to the lesser of T and $\tau$ and:
when T is less than $\tau$, then, after elapsed time T, the UE assumes an ACK and uses a corresponding HARQ process ID for transmission of a new data packet at the time $\tau$.

* * * * *